United States Patent
Briggs et al.

(10) Patent No.: US 12,182,549 B1
(45) Date of Patent: Dec. 31, 2024

(54) COLOR SELECTION SCHEMES FOR STORAGE ALLOCATION

(71) Applicant: Amazon Technologies, Inc., Seattle, WA (US)

(72) Inventors: Preston Pengra Briggs, Seattle, WA (US); Ron Diamant, Santa Clara, CA (US); Robert Geva, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/230,988

(22) Filed: Aug. 7, 2023

Related U.S. Application Data

(63) Continuation of application No. 17/341,762, filed on Jun. 8, 2021, now Pat. No. 11,775,268.

(51) Int. Cl.
G06F 8/41 (2018.01)
G06F 9/30 (2018.01)
G06F 12/06 (2006.01)

(52) U.S. Cl.
CPC ........... G06F 8/41 (2013.01); G06F 8/441 (2013.01); G06F 9/30123 (2013.01); G06F 12/0646 (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 4,571,678 A * | 2/1986 | Chaitin | G06F 8/441 717/146 |
| 2004/0003385 A1 | 1/2004 | Kushlis | |
| 2004/0064811 A1 | 4/2004 | Altmejd | |
| 2004/0187102 A1 | 9/2004 | Garthwaite | |
| 2007/0074190 A1* | 3/2007 | Verbitsky | G06F 8/441 717/146 |
| 2007/0150691 A1 | 6/2007 | Illendula et al. | |
| 2007/0255676 A1 | 11/2007 | Brown et al. | |
| 2009/0313612 A1 | 12/2009 | Vick et al. | |
| 2013/0198495 A1 | 8/2013 | Vick et al. | |

(Continued)

OTHER PUBLICATIONS

U.S. Appl. No. 17/341,762, Patent Application, "Color Selection Schemes for Storage Allocation", filed Jun. 8, 2021.

(Continued)

*Primary Examiner* — Lewis A Bullock, Jr.
*Assistant Examiner* — Mark A Gooray
(74) *Attorney, Agent, or Firm* — Kilpatrick Townsend & Stockton LLP

(57) ABSTRACT

A compiler-implemented technique for performing a storage allocation is described. Computer code to be converted into machine instructions for execution on an integrated circuit device is received. The integrated circuit device includes a memory having a set of memory locations. Based on the computer code, a set of values that are to be stored on the integrated circuit device are determined. An interference graph that includes the set of values and a set of interferences is constructed. While traversing the interference graph, a set of memory location assignments are generated by assigning the set of values to the set of memory locations in accordance with one or more color selection schemes.

20 Claims, 18 Drawing Sheets

(56) References Cited

U.S. PATENT DOCUMENTS

2013/0246731 A1  9/2013  Lee et al.
2015/0350324 A1  12/2015  Hu et al.

OTHER PUBLICATIONS

U.S. Appl. No. 17/343,435, Patent Application, "Compiler-Driven Storage Allocation of Runtime Values", filed Jun. 9, 2021.
Chaitin, "Register Allocation & Spilling via Graph Coloring" Proceedings of the ACM SIGPLAN '82 Symposium on Compiler Construction, pp. 98-105, (1982). (Jun. 1982).
Non-Final Office Action, U.S. Appl. No. 17/341,762, 19 pages, Nov. 15, 2022.
Notice of Allowance, U.S. Appl. No. 17/341,762, 14 pages, May 30, 2023.

* cited by examiner

```
1 —  A = ...
2 —  B = ...
3 —  C = A + B
4 —  D = A + C
5 —  E = A - B
6 —  F = B + E
7 —  G = D + F
8 —  write G
```

COLOR SELECTION SCHEMES FOR STORAGE ALLOCATION

CROSS-REFERENCE TO RELATED APPLICATION

This application claims priority to and is a continuation of U.S. patent application Ser. No. 17/341,762 filed Jun. 8, 2021, issued as U.S. Pat. No. 11,775,268 on Oct. 3, 2023 and entitled "COLOR SELECTION SCHEMES FOR STORAGE ALLOCATION," the content of which is hereby incorporated by reference in its entirety for all purposes.

BACKGROUND

The operations of an integrated circuit device, such as a processor, can be directed by machine-level instructions. These instructions can be generated by a software program referred to as a compiler, which transforms programs written in a human-readable programming language into a machine language that can be understood by the integrated circuit device. The output of the compiler can be referred to as program code, object code, program instructions, or machine instructions, among other examples.

Compilers may utilize various phases that work together in coordination to perform the compilation. Some of these phases may relate to optimizations that aim to minimize the computer program's execution time, power consumption, and memory usage when the instructions are executed on the integrated circuit device. For example, the compiler may include a phase referred to as an instruction scheduler, which attempts to rewrite the code to improve instruction-level parallelism. The instruction scheduler may decompose instructions into multiple stages to improve the pipelining of the instructions. As another example, the compiler may include a phase referred to as a storage allocator, which attempts to assign values that will be generated during execution to specific storage locations on the integrated circuit device.

BRIEF DESCRIPTION OF THE DRAWINGS

Various embodiments in accordance with the present disclosure will be described with reference to the drawings, in which.

DETAILED DESCRIPTION

Figures 1A, 1B:
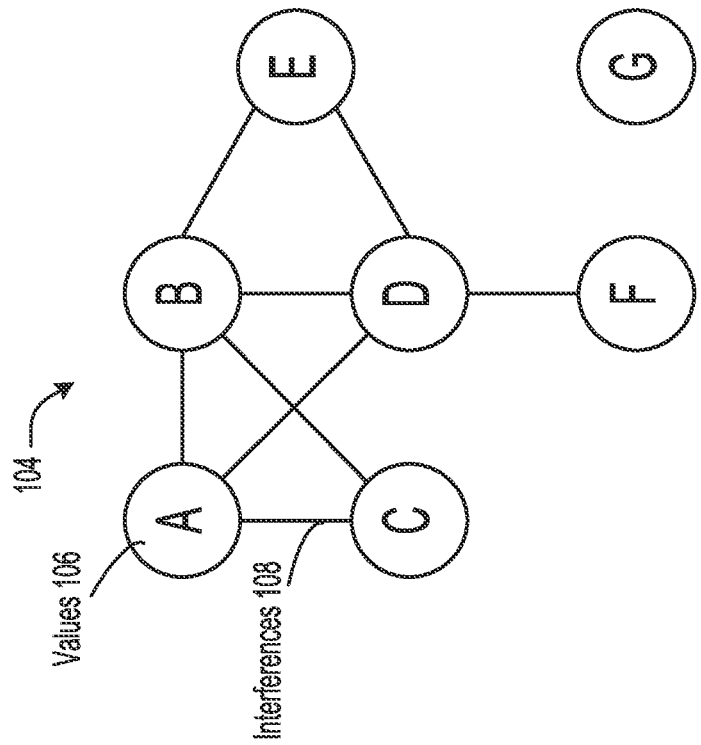
FIGS. 1A and 1B illustrate an example construction of an interference graph based on computer code.

Some optimizations performed by a compiler may be dependent on the specific architecture of the integrated circuit device that is to execute the compiler-generated instructions. These optimizations are generally performed after the hardware-independent optimizations have been performed, and receive as input an intermediate representation of the source code outputted by the hardware-independent optimizations. In various examples, the hardware-specific optimizations may take into consideration the number of registers on the integrated circuit device, the instruction set architecture (ISA) of the integrated circuit device, the supported data types, the cache size, the memory transfer rates, the number of arithmetic logic units (ALUs) or floating-point units (FPUs) on the integrated circuit device, among other possibilities.

In some cases, the integrated circuit device can include multiple execution engines. For example, the integrated circuit device can include parallel execution engines that are capable of performing large, multi-stage computations, such as convolutions. As another example, the integrated circuit device can include execution engines for more specific operations, such as accumulating values or performing floating point math. The data on which the execution engines operate can be retrieved from a memory of the integrated circuit device. Results produced by the execution engines can further be written to the memory.

In some instances, integrated circuit devices having multiple execution engines can be used to execute operations of an artificial neural network. Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, includes multiple layers of processing nodes. Each processing node (or simply "node") in a layer can perform computations on input data generated by processing nodes in a preceding layer to generate output data. For example, a processing node may perform a set of arithmetic operations, such as multiplications and additions to generate an intermediate output, or perform post-processing operations on the intermediate output to generate a final output. An artificial neural network may include thousands or more of processing nodes and millions or more of parameters.

When the integrated circuit device includes multiple execution engines, in various examples, the compiler can produce sets of instructions for each execution engine. The instructions for an execution engine can includes steps such as reading data from memory of the device, performing a computation on the data, and writing a result of the computation back to the memory of the device. In some examples, the execution engines can asynchronously and independently execute respective sets of instructions so that the execution engines can operate in parallel.

In some instances, the compiler may include a phase referred to as a storage allocator, which attempts to assign values (or variables) that will be generated during execution to specific memories or storage locations on the integrated circuit device. While smaller values such as scalars may be assigned to low-capacity memories such as registers, larger values such as vectors, tensors, and arrays may be assigned to higher-capacity memories such as the integrated circuit device's main memory, generally consisting of dynamic random-access memory (DRAM), or other available memory on the integrated circuit device such as static random-access memory (SRAM) forming caches or scratchpad memory.

When allocating values to memories or storage locations, the storage allocator may consider the characteristics of both the values and the memories. This may include the size (capacity) of each memory, the latency associated with reading from or writing to each memory, and the organization of each memory. For values, the storage allocator may consider the size of each value, the amount of time or cycles each value will need to be stored, and the cost associated with storing or transferring each value to each memory.

Generally, the storage allocator attempts to assign as many values as possible to low-latency memory, such as registers and other SRAM. Values that are unable to be assigned to the low-latency memory are "spilled" and assigned to high-latency memory, such as the main memory or other DRAM. For each type of memory, the storage allocator may employ a different algorithm for fitting as many values as possible. For example, the problem of packing scalars into registers is called register allocation and is usually approached using either linear-scan allocation or graph-coloring allocation. Despite the progress of current storage allocators and storage allocation algorithms such as graph-coloring allocation, new techniques to improve storage allocation are needed.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Embodiments of the present disclosure provide for compiler-driven techniques for performing a storage allocation to allocate values to a memory. The described techniques may include the determination of the values to be used during runtime execution, followed by the construction of an interference graph that includes the values as well as any interferences that exist between the values. The interferences capture which values need to be stored in the memory at the same time (e.g., they are simultaneously live at some point in the program) and therefore cannot overlap or occupy any of the same memory locations.

After construction of the interference graph, the values in the graph may be "colored" in accordance with one or more color selection schemes, in which a color is selected for each of the values. In some instances, selecting a color for a value may entail assigning the value to a memory location in the memory. Each value may be assigned to a memory location or, alternatively or additionally, be marked to be spilled to a second higher-latency memory. A mapping between colors and memory locations may indicate which memory locations a value is to be assigned to if it is colored with a particular color. In some instances, the mapping may be determined prior to selection of the color selection scheme, and each of the color selection schemes may utilize the same mapping.

In some embodiments, the compiler may generate a set of memory location assignments while traversing the interference graph. The interference graph may be traversed during both a simplification process and a rebuilding process. During the simplification process, values may be repeatedly removed from the interference graph, one or more at a time, based on some measure indicative of the difficulty of assigning the value to a memory location (e.g., based on the number of interferences each value has). During the rebuilding process, the values may be added back into the interference graph in the opposite order in which they were removed. As the values are added back, they may be assigned to memory locations based on the currently employed color selection scheme and such that values that interfere do not overlap in memory.

FIGS. 1A and 1B illustrate an example construction of an interference graph 104 based on sample computer code 102, in accordance with some embodiments. Interference graph 104 may include a set of values 106 (or, alternatively, interference graph 104 may be considered to include a set of nodes representing values 106) and a set of interferences 108 connecting values 106 (or, alternatively, interference graph 104 may be considered to include a set of edges representing interferences 108). For example, two values (or nodes) connected by an interference (or edge) in interference graph 104 may be considered to interfere with each other during execution of computer code 102 on the target integrated circuit device.

In the illustrated example of FIG. 1A, computer code 102 forms a program that includes 8 lines of instructions that include line 1 through line 8. At lines 1 and 2, values A and B are defined, respectively. At line 3, value C is calculated as the sum of values A and B. At line 4, value D is calculated as the sum of values A and C. At line 5, value E is calculated as the difference between values A and B. At line 6, value F is calculated as the sum of values B and E. At line 7, value G is calculated as the sum of values D and F. At line 8, value G is written. In various implementations, one or more of values A through G may be scalars, vectors, tensors, arrays, among other possibilities.

In some embodiments, the compiler may construct interference graph 104 by performing a backwards walk across computer code 102, maintaining a list of live values or variables and collecting interferences 108. For example, the compiler may determine that, between lines 7 and 8, only value G is live. Between lines 6 and 7, the compiler may determine that values D and F are live. Because value F is defined at line 6, the compiler may make value F interfere with value D. Between lines 5 and 6, the compiler may determine that values B, D, and E are live. Because value E is defined at line 5, the compiler may make value E interfere with values B and D.

Between lines 4 and 5, the compiler may determine that values A, B, and D are live. Because value D is defined at line 4, the compiler may make value D interfere with values A and B. Between lines 3 and 4, the compiler may determine that values A, B, and C are live. Because value C is defined at line 3, the compiler may make value C interfere with values A and B. Between lines 2 and 3, the compiler may determine that values A and B are live. Because value B is defined at line 2, the compiler may make value B interfere with value A. Between lines 1 and 2, the compiler may determine that only value A is live. These determined interferences are reflected in interference graph 104.

Figure 2A:
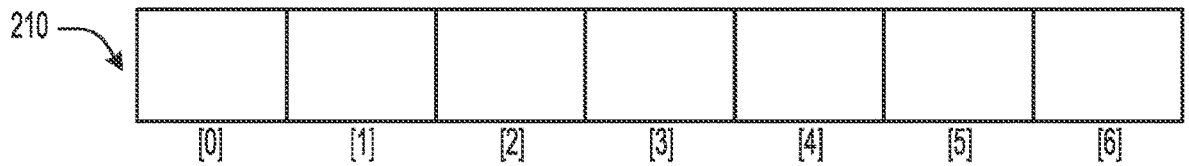
FIGS. 2A-2C illustrate an example storage allocation of values into a memory.
Figure 2B:
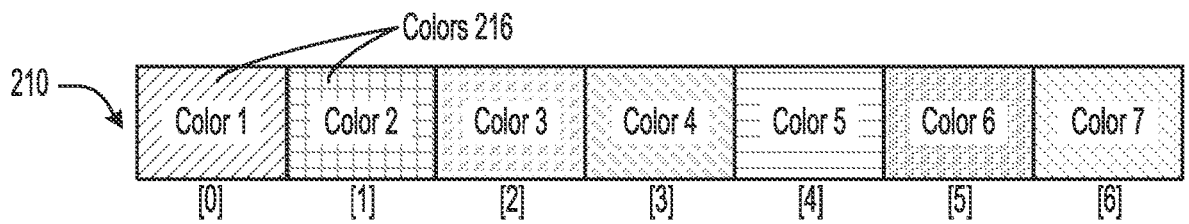
Figure 2C:
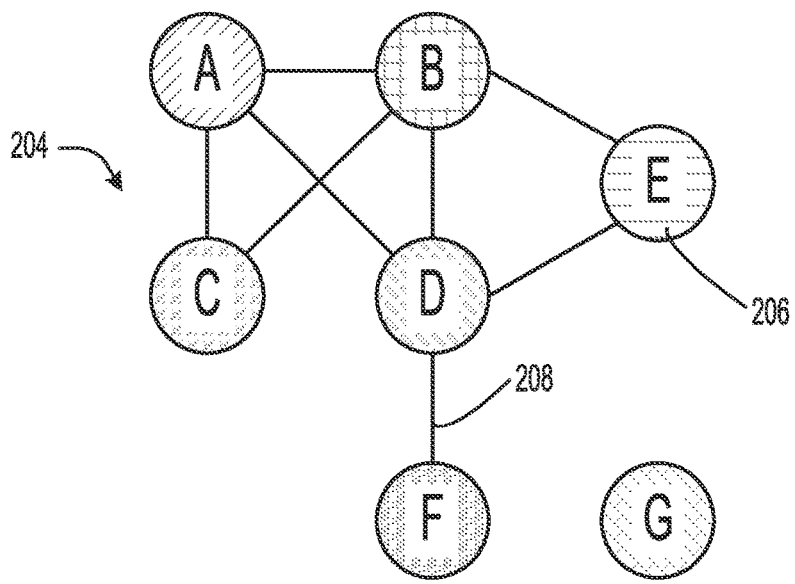

FIGS. 2A-2C illustrate an example storage allocation of values 206 into a memory 210, in accordance with some embodiments. In FIG. 2A, memory 210 is shown including memory locations [0] through [6]. Memory 210 may be a set of processor registers, a scratchpad memory, a cache, or any combination thereof, among other possibilities. For example, memory location [0] may correspond to a first processor register, memory location [1] may correspond to a second processor register, and the like. As another example, memory locations [0] through [2] may be processor registers, and memory locations [3] through [6] may be memory locations in a scratchpad memory or other type of RAM.

In FIG. 2B, a mapping between a set of colors 216 and the memory locations of memory 210 is shown. In the illustrated example, color 1 of colors 216 is mapped to memory location [0], color 2 of colors 216 is mapped to memory location [1], and so on. In some embodiments, a single color may be mapped to multiple memory locations or memory ranges. For example, in another embodiment, color 1 may be mapped to memory locations [0] and [1], color 2 may be mapped to memory location [2], and color 3 may be mapped to memory locations [3] through [6].

In FIG. 2C, an interference graph 204 is constructed that includes values 206 connected by interferences 208, including an interference between each pair of values A and B, values A and C, values B and C, and so on. FIG. 2C further shows the result of the storage allocation through the selected colors for each of values 206, with value A being colored with color 1 and assigned to memory location [0], value B being colored with color 2 and assigned to memory location [1], value C being colored with color 3 and assigned to memory location [2], value D being colored with color 4 and assigned to memory location [3], value E being colored with color 5 and assigned to memory location [4], value F being colored with color 6 and assigned to memory location [5], and value G being colored with color 7 and assigned to memory location [6].

In the color selection scheme used in FIG. 2C, all seven of colors 216 were used, with colors being selected evenly such that all colors were selected once before any colors were selected for a second time. This color selection scheme offers high parallelism but high memory usage. It should be noted that the compiler could have found a number of different storage allocations using this same color selection scheme. For example, any of values 206 could be colored with any of colors 216, as long as each of colors 216 is used once.

Figure 3A:
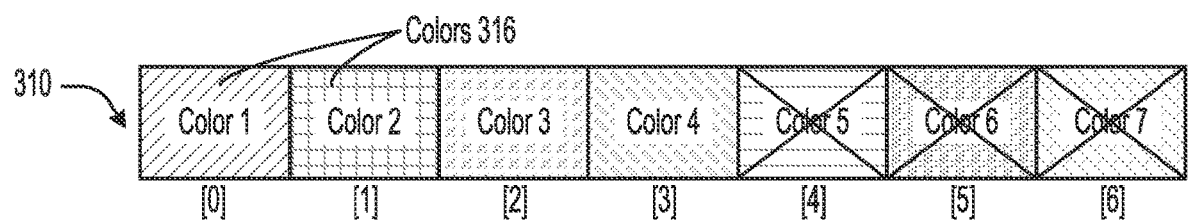
FIGS. 3A and 3B illustrate an example storage allocation of values into a memory.
Figure 3B:
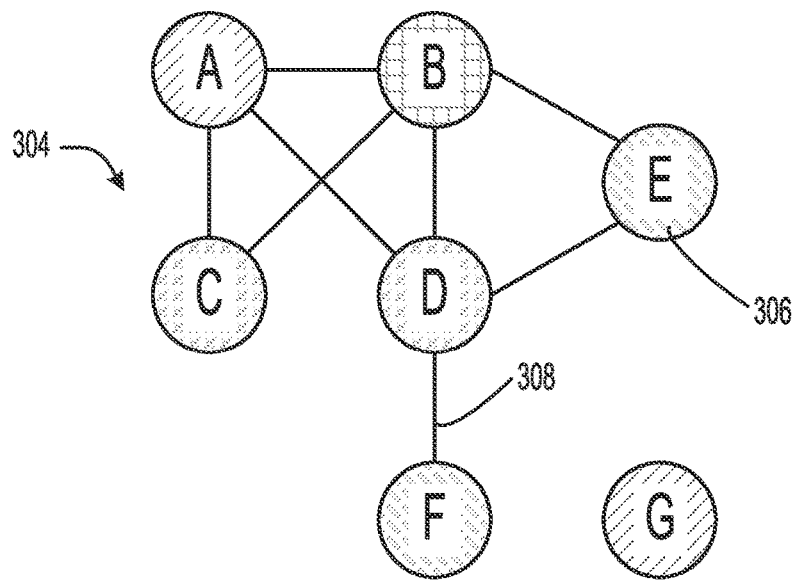

FIGS. 3A and 3B illustrate an example storage allocation of values 306 into a memory 310, in accordance with some embodiments. In FIG. 3A, memory 310 is shown including memory locations [0] through [6] with colors 316 being mapped in the same manner described in FIG. 2B. The color selection scheme used in FIGS. 3A and 3B uses only a subset of colors 316 that includes colors 1 through 4, offering lower parallelism and lower memory usage than the example of FIGS. 2A-2C. Furthermore, the color selection scheme used in FIGS. 3A and 3B attempts to reuse colors to some extent such that colors are selected unevenly and some colors may be selected for a second time before other colors have been selected once.

FIG. 3B shows an interference graph 304 having values 306 and interferences 308. Interference graph 304 is colored to show the result of the storage allocation. First, the compiler selects color 1 for value A and assigns value A to memory location [0]. Since values A and B interfere, the compiler selects color 2 for value B and assigns value B to memory location [1]. Since value C interferes with each of values A and B, the compiler selects color 3 for value C and assigns value C to memory location [2]. Since value D interferes with each of values A and B but not value C, the compiler selects color 3 for value D and assigns value D to memory location [2]. Continuing this process, the compiler selects color 4 for values E and F, assigning them to memory location [3], and color 1 for value G, assigning value G to memory location [0].

Figure 4A:
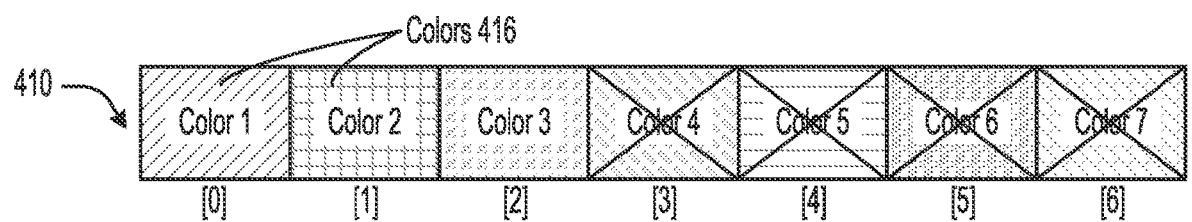
FIGS. 4A and 4B illustrate an example storage allocation of values into a memory.
Figure 4B:
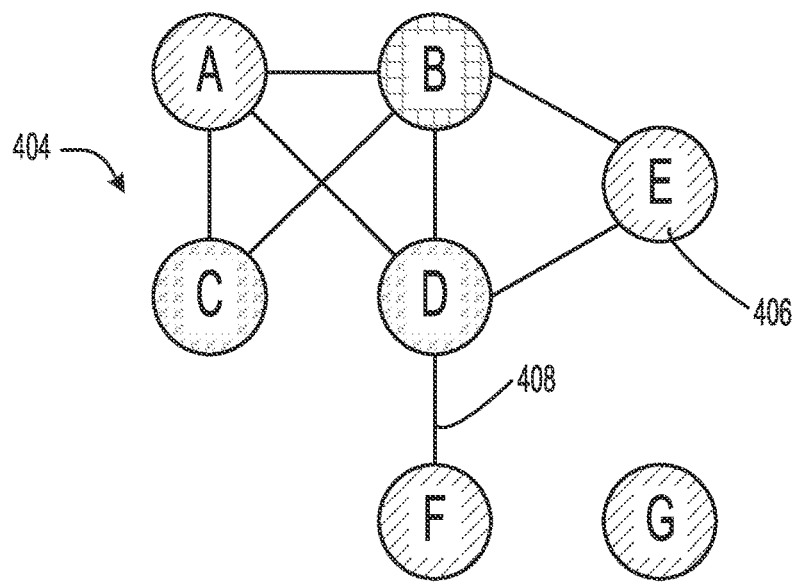

FIGS. 4A and 4B illustrate an example storage allocation of values 406 into a memory 410, in accordance with some embodiments. In FIG. 4A, memory 410 is shown including memory locations [0] through [6] with colors 416 being mapped in the same manner described in FIG. 2B. The color selection scheme used in FIGS. 4A and 4B uses only a subset of colors 416 that includes colors 1 through 3. Furthermore, the color selection scheme used in FIGS. 4A and 4B attempts to reuse colors to some extent such that colors are selected (or considered for selection) unevenly and some colors may be selected (or considered for selection) for a second time before other colors have been selected (or considered for selection) once.

FIG. 4B shows an interference graph 404 having values 406 and interferences 408. Interference graph 404 is colored to show the result of the storage allocation. The result differs from FIG. 3B in that values E and F are colored with color 1 and assigned to memory location [0]. With each of values A, E, F, and G being colored with color 1, the storage allocation in FIG. 4B offers even lower parallelism and lower memory usage than the example of FIGS. 2A-2C and the example of FIGS. 3A and 3B.

Figure 5B:
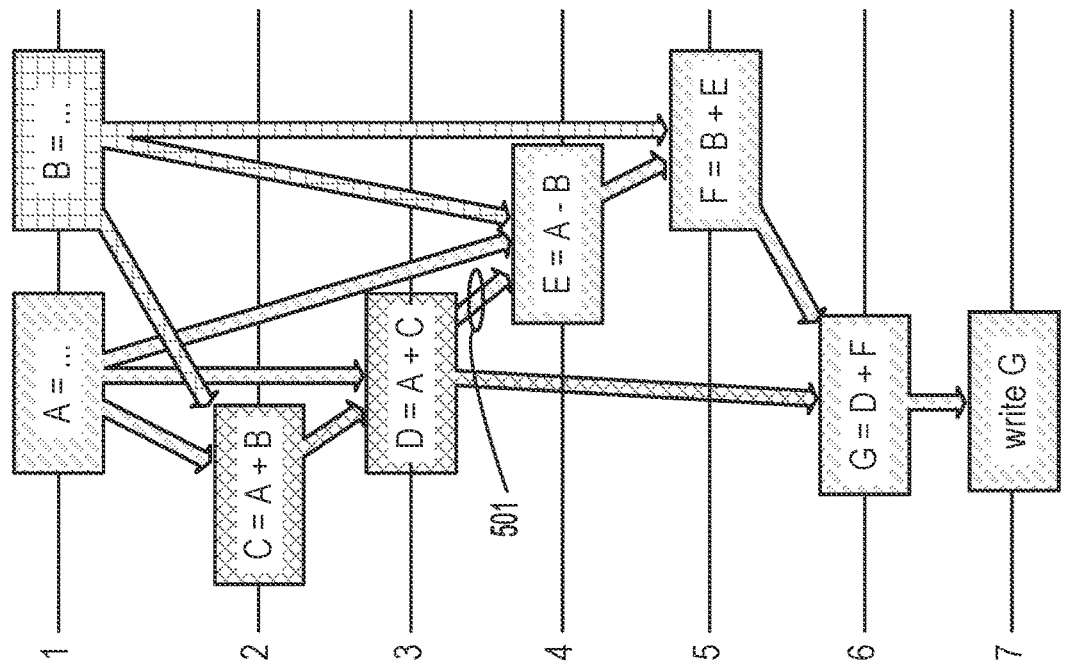
FIGS. 5A and 5B illustrate dependency graphs for the example storage allocations of FIGS. 3B and 4B.
Figure 5A:
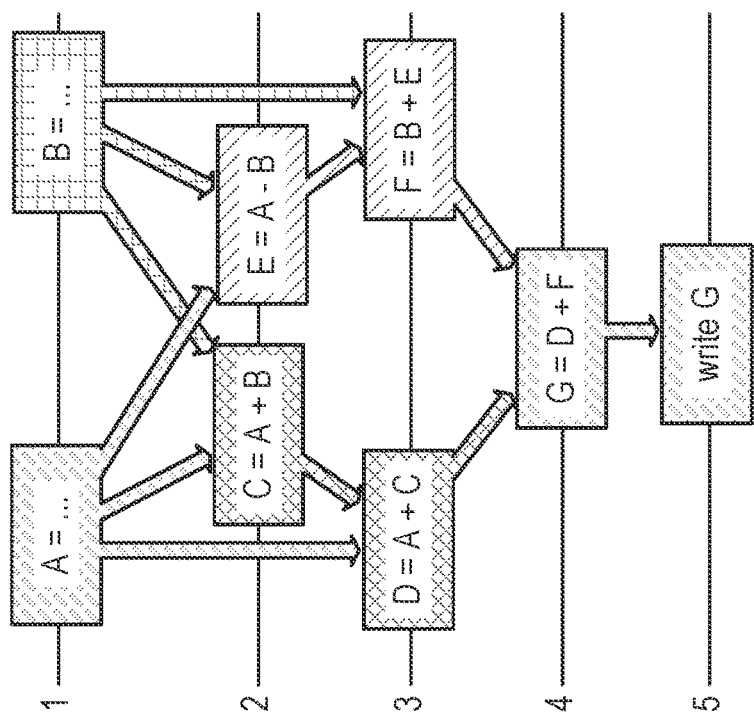

FIGS. 5A and 5B illustrate dependency graphs for the storage allocations of FIGS. 3B and 4B, in accordance with some embodiments. The graph in FIG. 5A shows the dependencies constraining the possible schedules given the coloring of interference graph 304. The graph in FIG. 5B shows the dependencies constraining the possible schedules given the coloring of interference graph 404. Given adequately parallel hardware, the graph in FIG. 5A could be scheduled to run in only 5 cycles while the graph in FIG. 5B would require at least 7 cycles.

The difference between the two graphs is due to dependence 501 in FIG. 5B, leading from the last use of value C to the definition of value E. Since both the definition of value E and dependence 501 are colored with color 1, the edge is called an anti dependence, whereas all the other edges are called flow dependencies. Any legal schedule must preserve the direction of all the dependence edges. This means that the definition of value D must always precede the definition of value E, significantly constraining the possible performance of the code.

As shown by the preceding examples, there may be a tension between the need to reduce the number of colors (and corresponding registers or memory locations) and the desire to increase parallelism. When the compiler reuses registers, it also reduces the available parallelism. It may be desirable to find a balance between the amount of parallelism and the amount of memory pressure that is caused. That is, in some cases it may be better to serialize so as to not overflow the storage while in other cases the memory footprint may be low and it may be desirable to parallelize as much as possible.

Figure 6A:
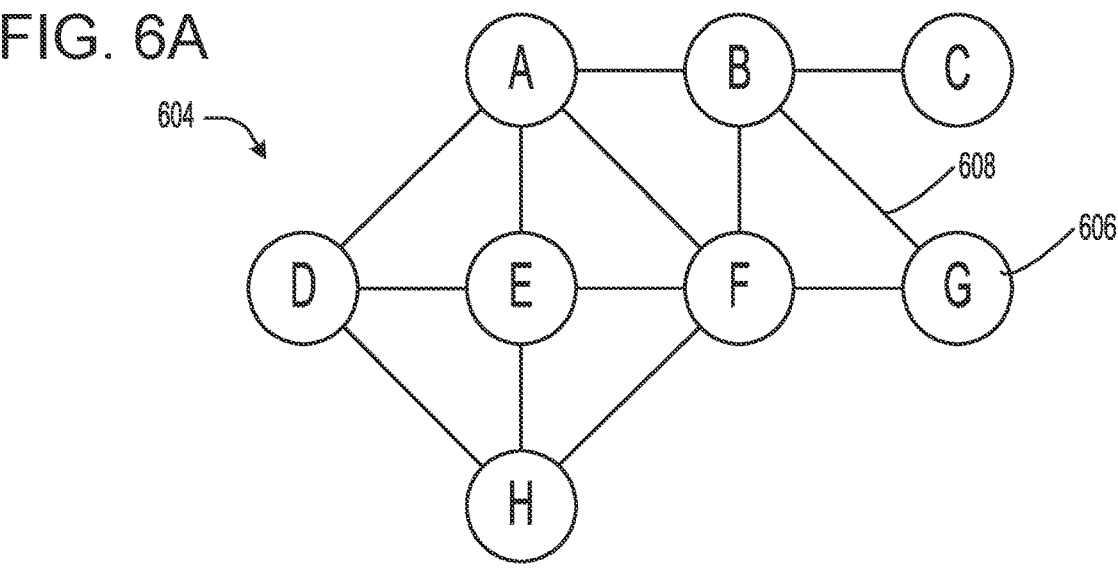
FIGS. 6A-6P illustrate example steps for a simplification process and a rebuilding process of a storage allocation algorithm.
Figure 6B:
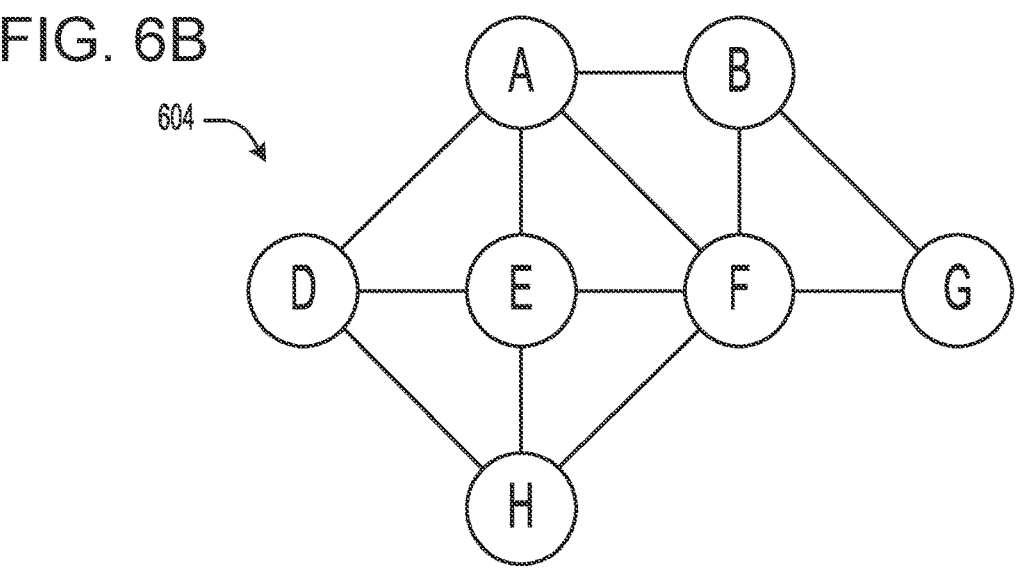
Figure 6C:
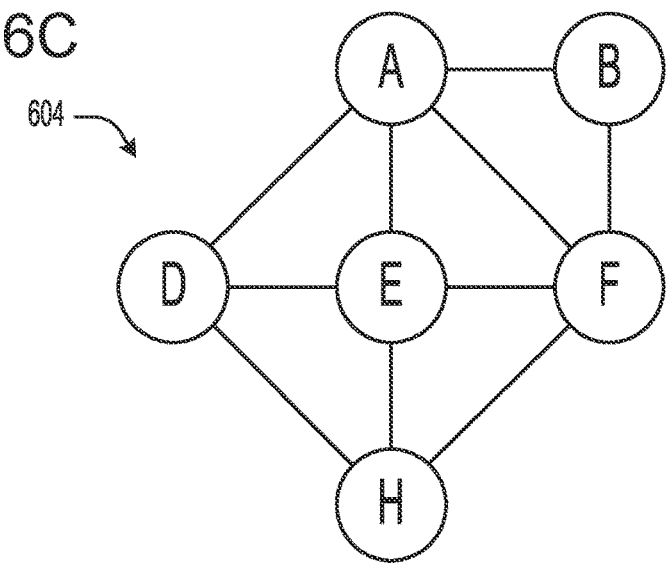
Figure 6D:
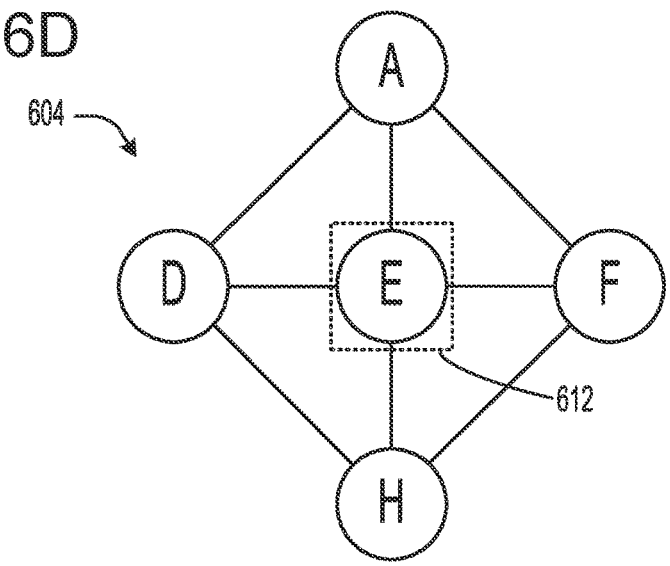
Figure 6E:
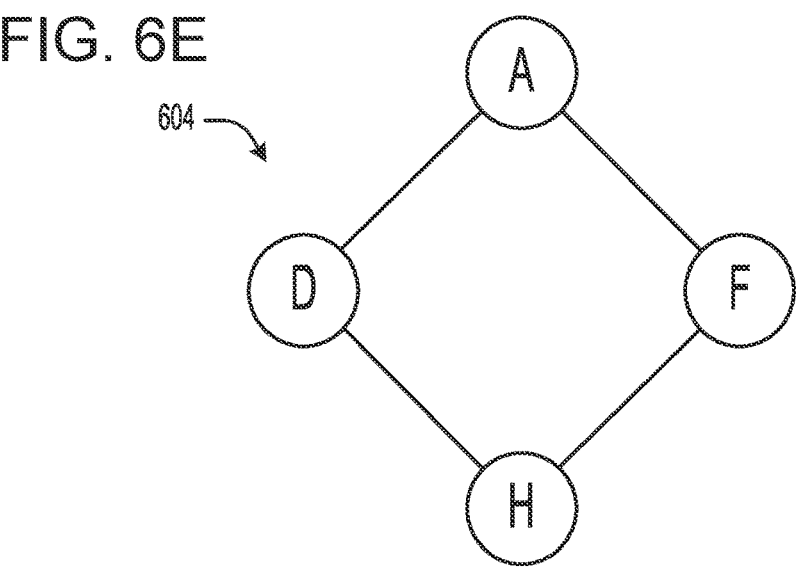
Figure 6F:
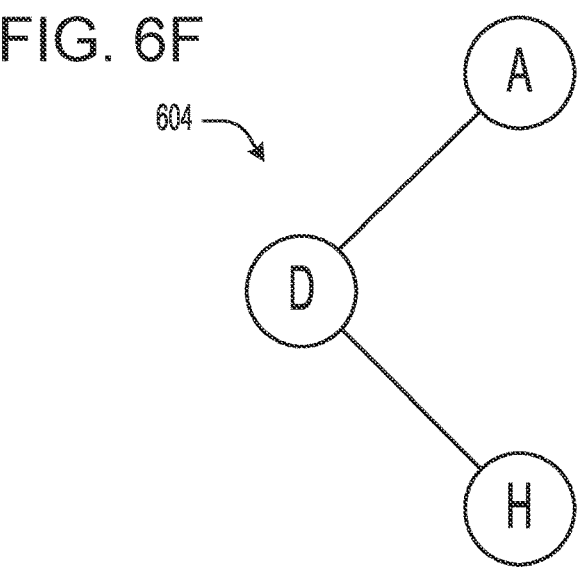
Figure 6G:
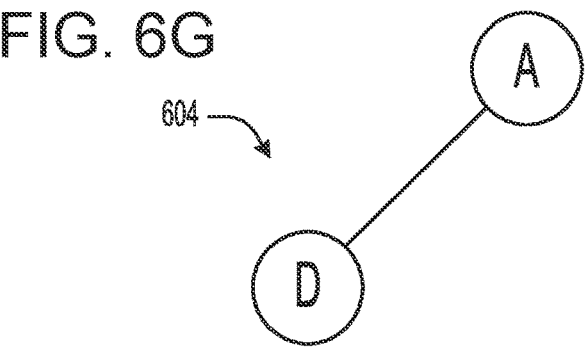
Figure 6H:
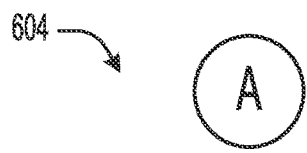
Figure 6I:
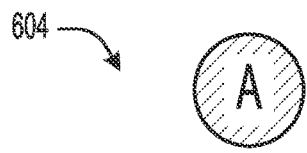
Figure 6J:
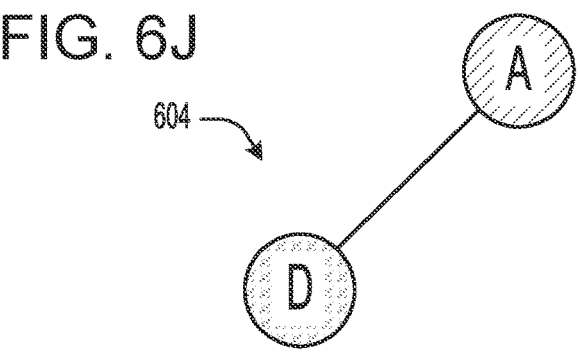
Figure 6K:
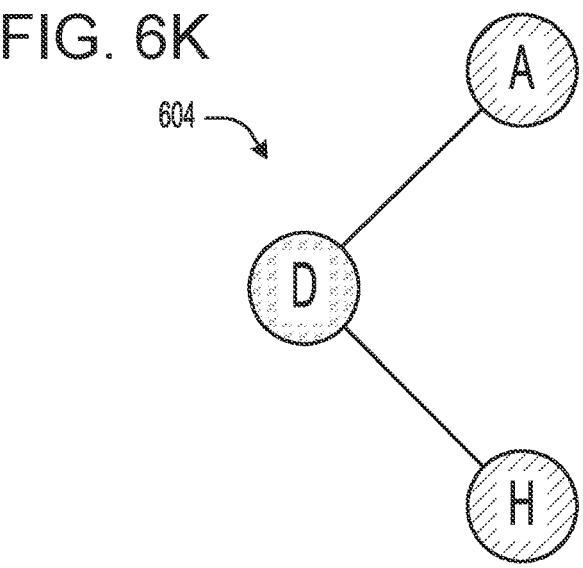
Figure 6L:
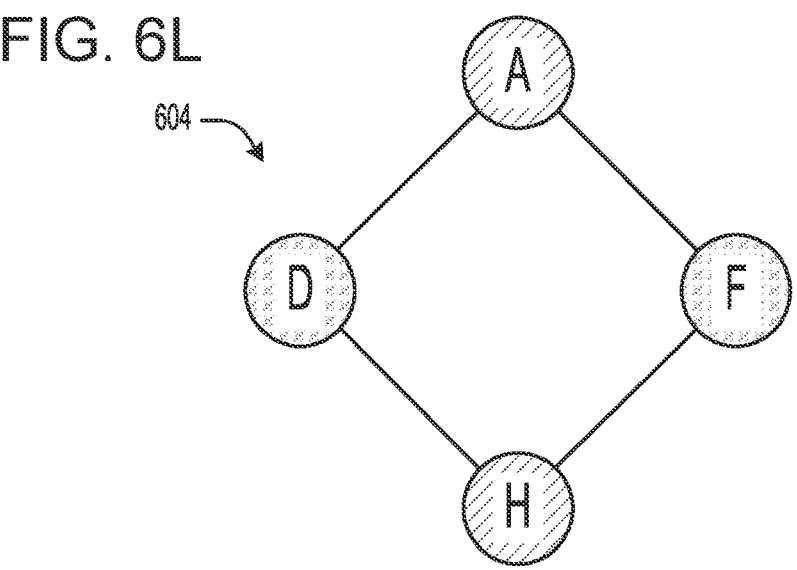
Figure 6M:
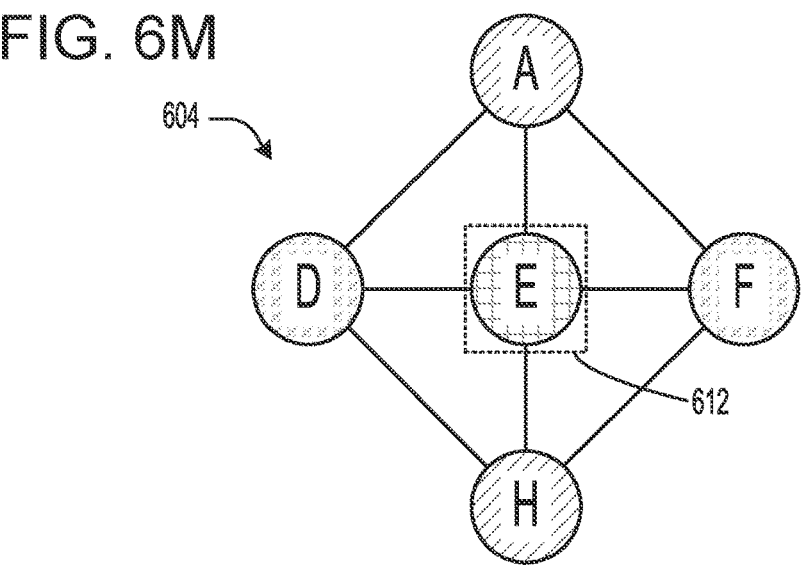
Figure 6N:
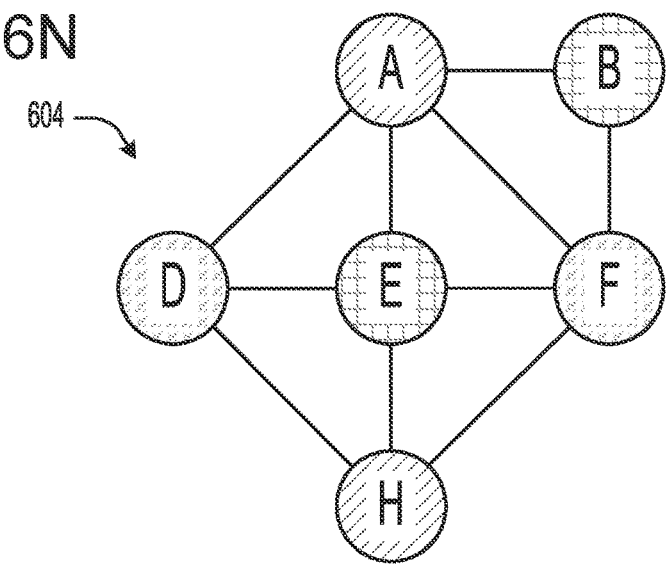
Figure 6O:
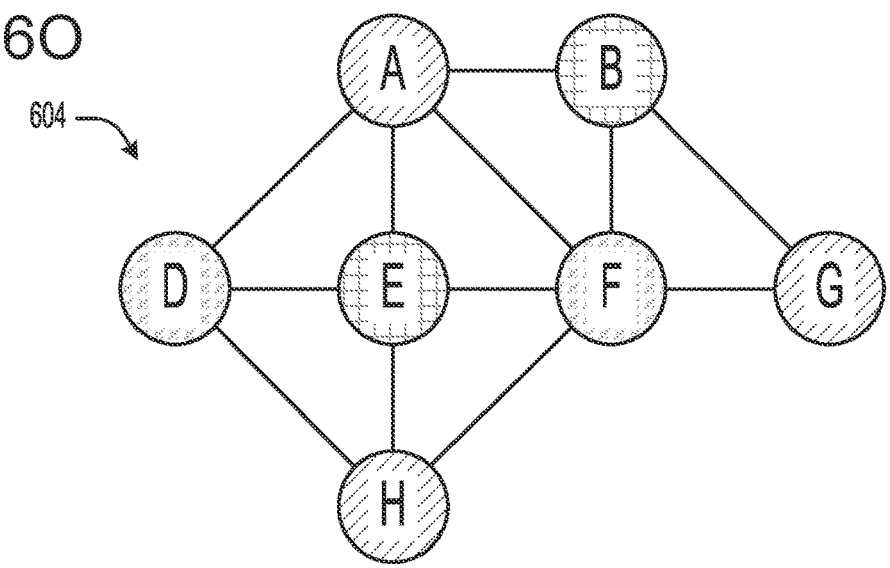
Figure 6P:
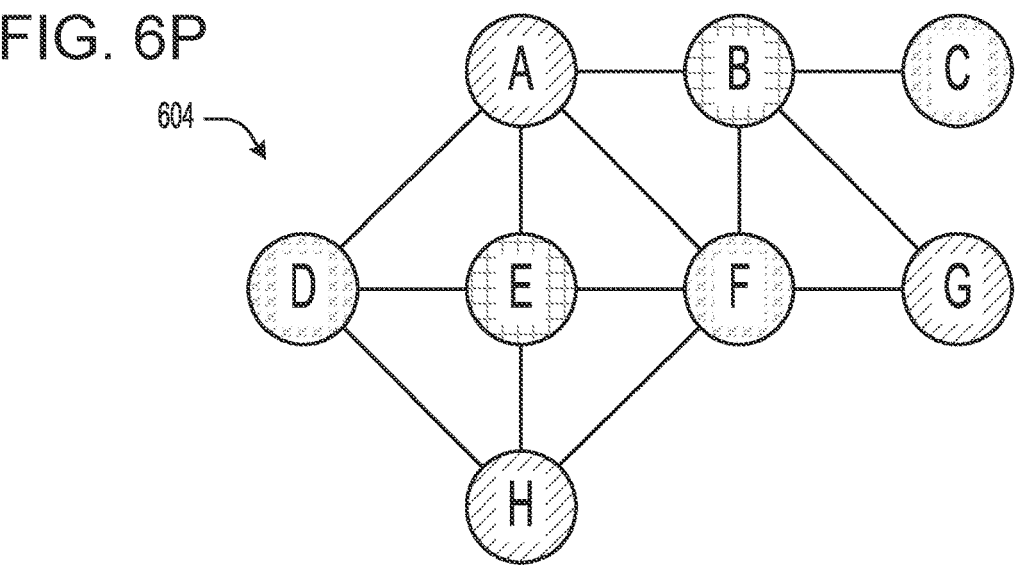

FIGS. 6A-6P illustrate example steps for a simplification process and a rebuilding process of a storage allocation algorithm, in accordance with some embodiments. Specifically, FIGS. 6A-6H illustrate example steps for the simplification process in which values are repeatedly removed from an interference graph and FIGS. 6I-6P illustrate example steps for the rebuilding process in which values are repeatedly added back into the interference graph. The example begins with an interference graph 604 having values 606 connected by interferences 608, indicating which pairs of values 606 have been determined to interfere with each other. The color selection scheme uses three colors that map to three memory locations (e.g., three processor registers or three sections/ranges of SRAM).

To simplify interference graph 604, the compiler looks for values with less than three connected interferences (or, equivalently, less than three neighbors), since the color selection scheme uses three colors. In FIG. 6A, the compiler finds value C with one connected interference and value G with two connected interferences. The compiler arbitrarily chooses to remove value C along with its interference, yielding interference graph 604 in FIG. 6B. In FIG. 6B, the compiler determines that only value G has less than three interferences, so the compiler removes value G along with its interferences.

In FIG. 6C, the compiler determines that removing value G's interferences lowered value B's interferences down to two, and therefore the compiler removes value B along with its interferences. In FIG. 6D, the compiler determines that none of the remaining values have less than three connected interferences. In response, the compiler may select one of the remaining values to be a spill candidate 612 and may remove the selected value from interference graph 604. In the illustrated example, value E is selected to be spill candidate 612 since it has the most connected interferences. Also, since this is the first spill candidate, the compiler may mark this point in the simplification process so that the compiler can modify the color selection scheme during the rebuilding process (e.g., by enabling a color rotation scheme).

In FIG. 6E, the compiler determines that all remaining values have less than three interferences and arbitrarily decides to remove value F along with its interferences. In FIGS. 6F, 6G, and 6H, the compiler decides to remove values H, D, and A, respectively, along with their interferences. Once interference graph 604 is empty, the compiler performs the rebuilding process by repeatedly adding value 606 back into interference graph 604 in the opposite order in which they were removed.

In FIG. 6I, the compiler determines that value A was the last value removed from interference graph 604 and, in response, the compiler restores value A to interference graph 604 and colors value A in accordance with a first color selection scheme, which provides that color 1 is selected for value A, assigning value A to the memory location mapped to color 1. In the illustrated example, the first color selection scheme may be a color reuse scheme. In FIG. 6J, the compiler determines that value D was the second-to-last value removed from interference graph 604 and, in response, the compiler restores value D to interference graph 604 and colors value D in accordance with the first color selection scheme, which provides that color 3 is selected for value D, assigning value D to the memory location mapped to color 3.

In FIG. 6K, the compiler determines that value H was the third-to-last value removed from interference graph 604 and, in response, the compiler restores value H to interference graph 604 and colors value H in accordance with the first color selection scheme, which provides that color 1 is selected for value H, assigning value H to the memory location mapped to color 1. In FIG. 6L, the compiler determines that value F was the fourth-to-last value removed from interference graph 604 and, in response, the compiler restores value F to interference graph 604 and colors value F in accordance with the first color selection scheme, which provides that color 3 is selected for value F, assigning value F to the memory location mapped to color 3.

In FIG. 6M, the compiler determines that value E was the fifth-to-last value removed from interference graph 604 and, in response, the compiler restores value H to interference graph 604. Since value E was marked as a spill candidate, the compiler determines whether it needs to spill value E or whether the value can be colored. Since color 2 is still available (all neighboring values are colors 1 or 3), in part due to the first color selection scheme being the color reuse scheme, the compiler determines that value E does not need to be spilled, and accordingly selects color 2 for value E, assigning value E to the memory location mapped to color 2. After the first spill candidate has been handled (by being colored or spilled), the compiler may switch the color selection scheme from a first color selection scheme to a second color selection scheme. In the illustrated example, the second color selection scheme may be a color rotation scheme.

In FIG. 6N, the compiler determines that value B was the sixth-to-last value removed from interference graph 604 and, in response, the compiler restores value B to interference graph 604 and colors value B in accordance with the second color selection scheme, which provides that color 2 is selected for value B, assigning value B to the memory location mapped to color 2. In FIG. 6O, the compiler restores value G to interference graph 604 and colors value G with color 1 in accordance with the second color selection scheme. In FIG. 6P, the compiler restores value C to interference graph 604 and colors value C with color 3 in accordance with the second color selection scheme. It should be noted that value C would have been colored with color 1 had the color selection scheme not switched from the first color selection scheme.

Figure 7A:
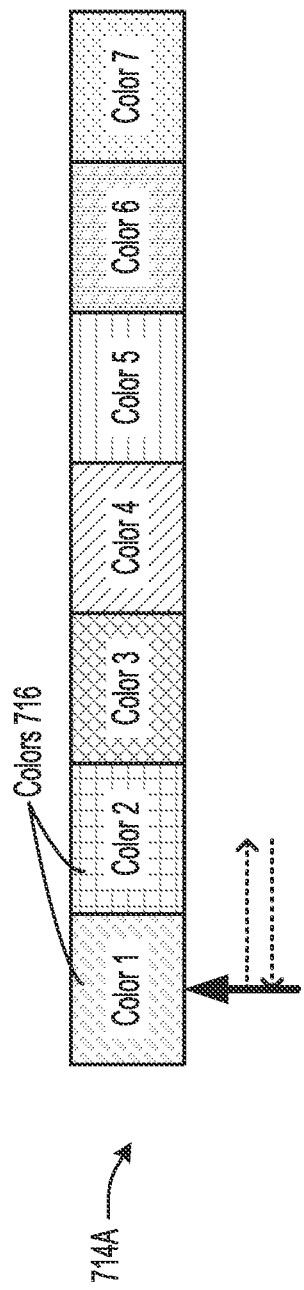
FIGS. 7A-7E illustrate example color selection schemes.

FIGS. 7A-7E illustrate example color selection schemes 714, in accordance with some embodiments. FIG. 7A shows a color selection scheme 714A that selects among seven colors. Color selection scheme 714A is a color reuse scheme that attempts to reuse colors when given a choice between multiple colors. For example, in some embodiments, color selection scheme 714A may always first check to see if color 1 can be used, then check if color 2 can be used, followed by color 3, etc., regardless of how many times those colors have been used previously. In other words, color selection scheme 714A provides that colors are non-sequentially and unevenly considered for selection.

Figure 7B:
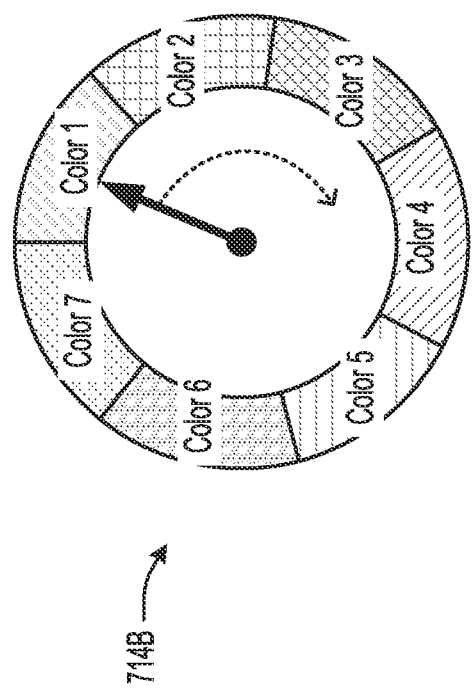

FIG. 7B shows a color selection scheme 714B that also selects among seven colors but is a color rotation scheme that attempts to rotate between colors when given a choice between multiple colors. For example, in some embodiments, color selection scheme 714B may check to see if color 1 can be used for a first value. If the first value is able to be colored with color 1, the scheme checks whether color 2 can be used for a second value. If the second value is unable to be colored with color 2, the scheme checks whether color 3 can be used for the second value. If the second value is able to be colored with color 3, the scheme checks whether color 4 can be used for a third value. If the third value is unable to be colored with color 4, the scheme checks whether colors 5, 6, 7, 1, 2, or 3 can be used, in that order. In other words, color selection scheme 714B provides that colors are sequentially and evenly considered for selection.

Figure 7C:
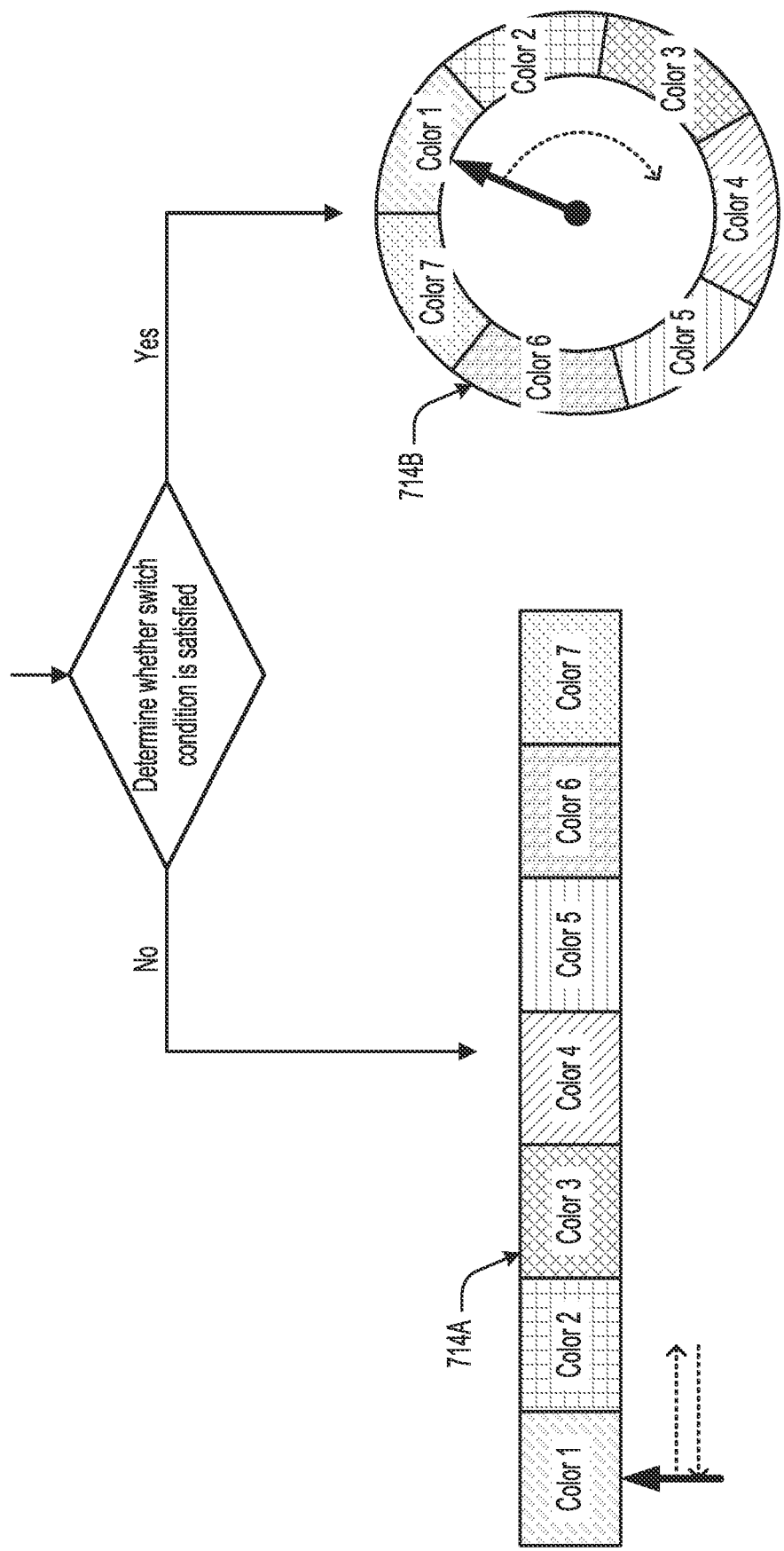

FIG. 7C shows the use of two color selection schemes in a single storage allocation. Based on whether a switch condition is satisfied, the compiler may switch between using color selection scheme 714A and color selection scheme 714B. In some embodiments, the compiler may repeatedly determine whether the switch condition is satisfied during the storage allocation algorithm. In some embodiments, the compiler may begin using color selection scheme 714A and may switch to using color selection scheme 714B once it is determined that the switch condition is satisfied.

Figure 7D:
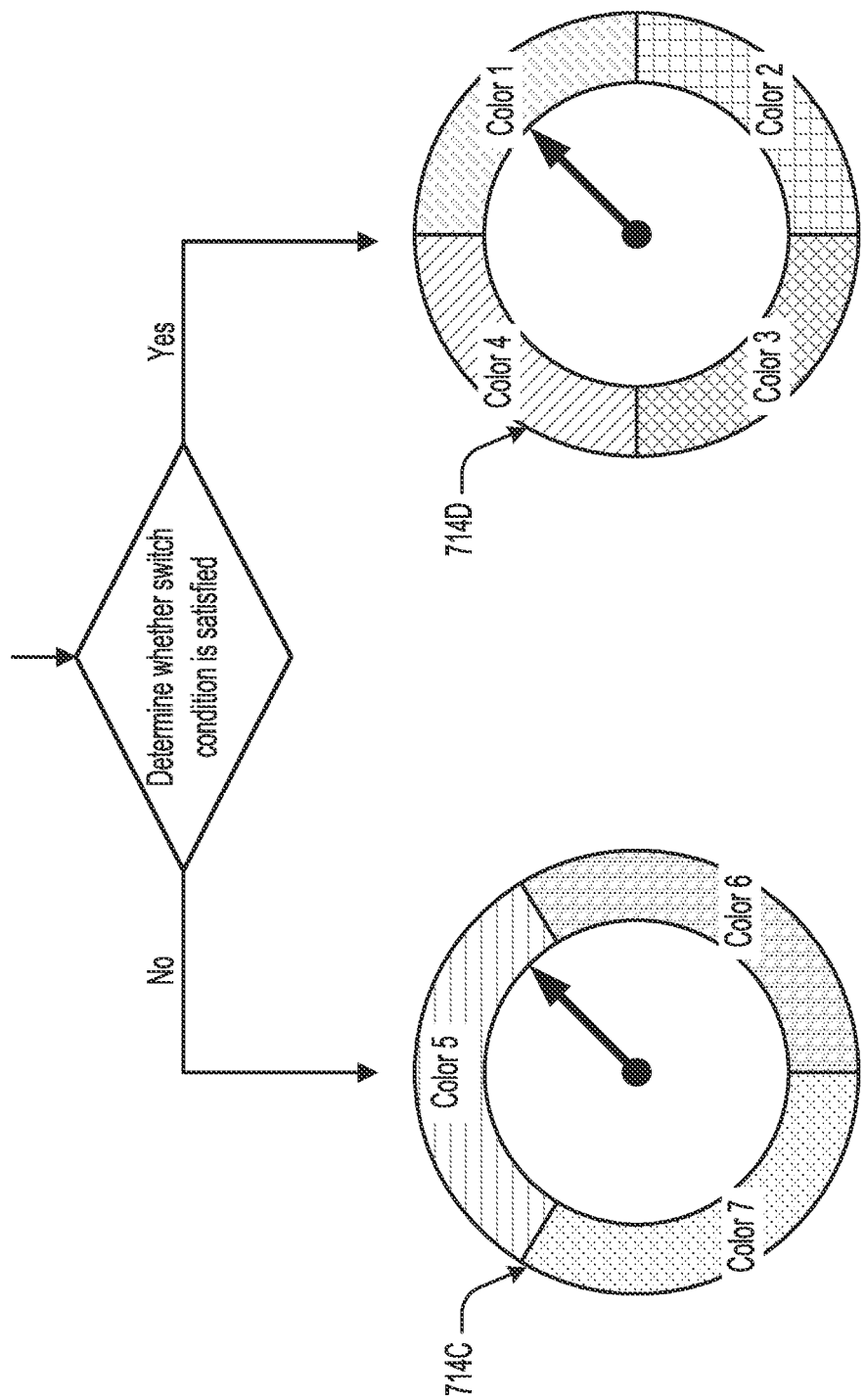

FIG. 7D shows the use of two color selection schemes in which a first color selection scheme 714C is a color rotation scheme that selects among three colors and a second color selection scheme 714D is a color rotation scheme that selects among four colors. In the illustrated example, the colors used by color selection scheme 714C are different than the colors used by color selection scheme 714D. In some embodiments, the switch condition may be whether a particular value is defined by a high-latency instruction. For example, if a value is defined by a low-latency instruction (e.g., an instruction that is not executed by a high-latency client such as a direct-memory access (DMA) engine), color selection scheme 714C may be used, and if a value is defined by a high-latency instruction (e.g., an instruction is at least partially executed by a high-latency client such as a DMA engine), color selection scheme 714D may be used. This allows some of the colors to be reserved for the high-latency instructions and also allows the system to be better tuned for parallelism versus memory pressure.

Figure 7E:
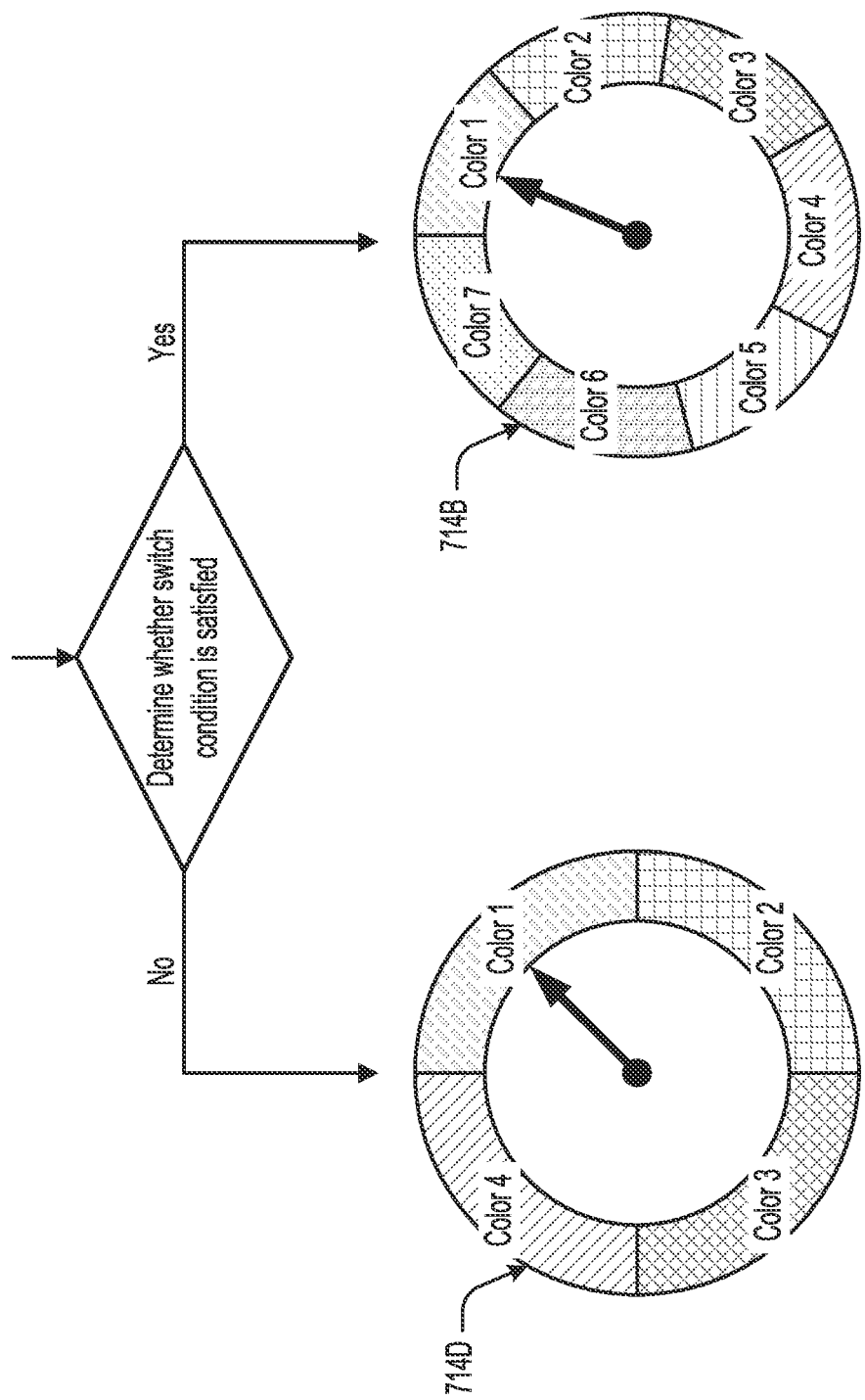

FIG. 7E shows the use of two color selection schemes in which a first color selection scheme 714D is a color rotation scheme that selects among four colors and a second color selection scheme 714B is a color rotation scheme that selects among seven colors. In the illustrated example, the colors used by color selection scheme 714D are a subset of the colors used by color selection scheme 714D. In some embodiments, the switch condition may be those described in FIG. 7D.

Figure 8:
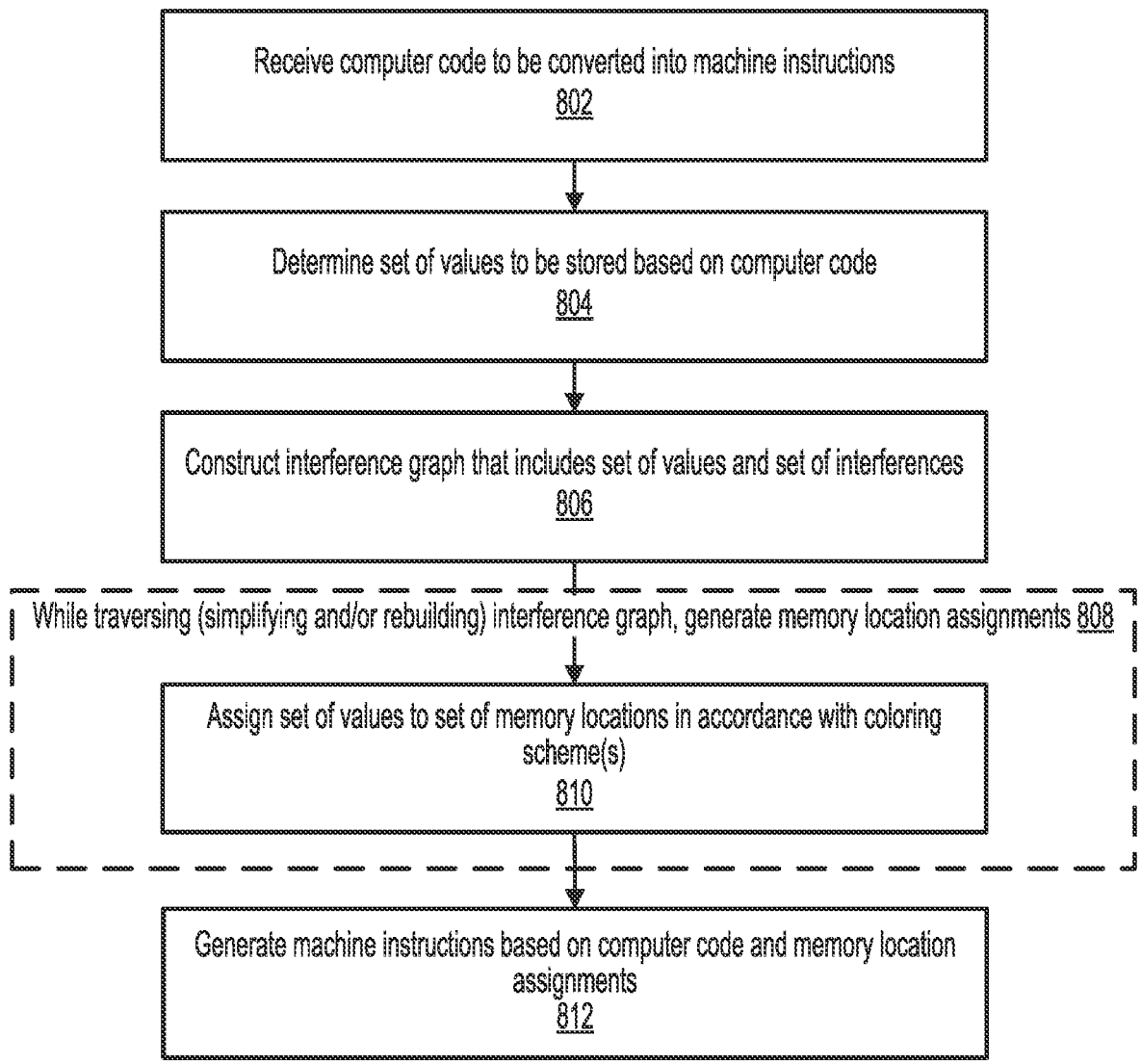
FIG. 8 illustrates a compiler-implemented method for performing a storage allocation.

FIG. 8 illustrates a compiler-implemented method 800 for performing a storage allocation, in accordance with some embodiments. One or more steps of method 800 may be omitted during performance of method 800, and steps of method 800 may be performed in any order and/or in parallel. One or more steps of method 800 may be performed by one or more processors. Method 800 may be implemented as a computer-readable medium or computer program product comprising instructions which, when the program is executed by one or more computers, cause the one or more computers to carry out the steps of method 800. Such computer program products can be transmitted, over a wired or wireless network, in a data carrier signal carrying the computer program product.

At step 802, computer code (e.g., computer code 102) is received. The computer code may be received by a compiler and/or a storage allocator of the compiler. The computer code may be an intermediate representation of source code. In some embodiments, the computer code may be generated by a different phase of the compiler such as, for example, the front end or the middle end of the compiler. The computer code may be received for the purpose of being converted into machine instructions for execution on an integrated circuit device.

At step 804, a set of values (e.g., values 106, 206, 306, 406, or 606) that are to be stored on the integrated circuit device during the execution of the machine instructions on the integrated circuit device are determined. The set of values may be determined based on the computer code. Each of the set of values may be a scaler, a vector, a tensor, an array, among other possibilities. In various examples, one or more of the set of values may be inputs used by the computer code, outputs generated by the computer code, temporary values utilized by the computer code for generating the outputs based on the inputs, weights or other parameters used in mathematical operations carried out by the computer code, among other possibilities.

In some embodiments, the integrated circuit device may include a processor and a memory (e.g., memory 210) having a set of memory locations. The memory may be a one-dimensional memory, a two-dimensional memory, an N-dimensional memory, or any memory suitable for storing the set of values. The memory may be a low-latency memory. For example, the memory may include one or more processor registers, a scratchpad memory, or a cache. In some embodiments, the integrated circuit device may further include a second memory separate from the memory. The second memory may be a high-latency memory such as main memory. In some embodiments, the memory may be SRAM and the second memory may be DRAM.

At step 806, an interference graph (e.g., interference graphs 104, 204, 304, 404, or 604) that includes the set of values and a set of interferences (e.g., interferences 108, 208, 308, 408, or 608) is constructed. The set of interferences may indicate which of the set of values are concurrently stored during the execution of the machine instructions on the integrated circuit device. In some embodiments, the compiler may analyze the computer code and determine various pairs of values that are simultaneously live during the execution of the machine instructions. The compiler may then generate an interference between each of the pairs of values, forming the set of interferences. In some embodiments, the interference graph may include a set of nodes that represent the set of values and a set of edges that represent the set of interferences.

At step 808, memory location assignments are generated while traversing the interference graph. The memory location assignments may include instructions that cause the set of values to be stored in the memory at the set of memory locations. Traversing the interference graph may include performing a simplification process of the interference graph and/or performing a rebuilding process of the interference graph. In some embodiments, performing the simplification process of the interference graph may include repeatedly removing one of the set of values from the interference graph based on a number of connected interferences for each of the set of values. For example, the value having the fewest number of connected interferences may be removed. In another example, any value having a number of connected interferences less than a predetermined threshold (a number of colors) may be removed. The set of values may be removed from the interference graph in accordance with a first order. The first order may indicate a first removed value, a second removed value, a third removed value, and so on.

In some embodiments, during the simplification process, a value of the set of values may be selected to be a spill candidate (e.g., spill candidate 612) based on the number of connected interferences for each of the set of values. For example, during the simplification process, if no remaining values have a number of connected interferences less than the predetermined threshold, one of the remaining values may be selected to be the spill candidate. In another example, during the simplification process, if no remaining values have a number of connected interferences less than the predetermined threshold, the remaining value with the highest number of connected interferences may be selected to be the spill candidate.

In some embodiments, performing the rebuilding process of the interference graph may include repeatedly adding one of the set of values back into the interference graph. The set of values may be added to the interference graph in accordance with a second order. The second order may be based on the first order. For example, the second order may be opposite the first order, such that the last removed value is the first added value, the second-to-last removed value is the second added value, and so on.

In some embodiments, step 808 may include step 810, at which the set of values are assigned to the set of memory locations in accordance with one or more one or more color selection schemes. Each of the one or more color selection schemes may provide that one of a set of colors (e.g., colors 216, 316, 416, or 716) is selected for a value, causing an assignment of the value to a memory location in the memory. A mapping between the set of colors and the set of memory locations may indicate which of the set of memory locations a value is to be assigned to if it is colored with a particular color. In some embodiments, the one or more color selection schemes includes a color rotation scheme. In some embodiments, the one or more color selection schemes may include a color reuse scheme. In some embodiments, the one or more color selection schemes may include both the color reuse scheme and the color rotation scheme.

During the rebuilding process, the set of values may be colored and/or assigned to the set of memory locations in accordance with the second order. For example, during the rebuilding process, the first added value may be colored and/or assigned to one of the set of memory locations first, the second added value may be colored and/or assigned to one of the set of memory locations second, the third added value may be colored and/or assigned to one of the set of memory locations third, and so on. The compiler may assign the set of values to the set of memory locations in a manner such that values that interfere do not overlap in the memory (e.g., are not assigned to the same color).

At step 812, the machine instructions are generated based on the computer code while incorporating the set of memory location assignments. In this manner, the machine instructions may cause the integrated circuit device to store the set of values at the set of memory locations in the memory as specified in the set of memory location assignments when the machine instructions are executed on the integrated circuit device.

In some embodiments, spill code may be inserted into the computer code for each value marked for spilling (e.g., for each spilled value). In some embodiments, each value marked for spilling may be stored in a second memory different than the memory, such as the integrated circuit device's main memory. The spilled value may be copied to the second memory after its definition and brought to the memory just before it is used. In some embodiments, the spill code may be inserted during a single pass over the computer code. In some embodiments, a new interference graph may be constructed that incorporates any changes brought about by generating the spill code, followed by repeating the above steps.

Figure 9:
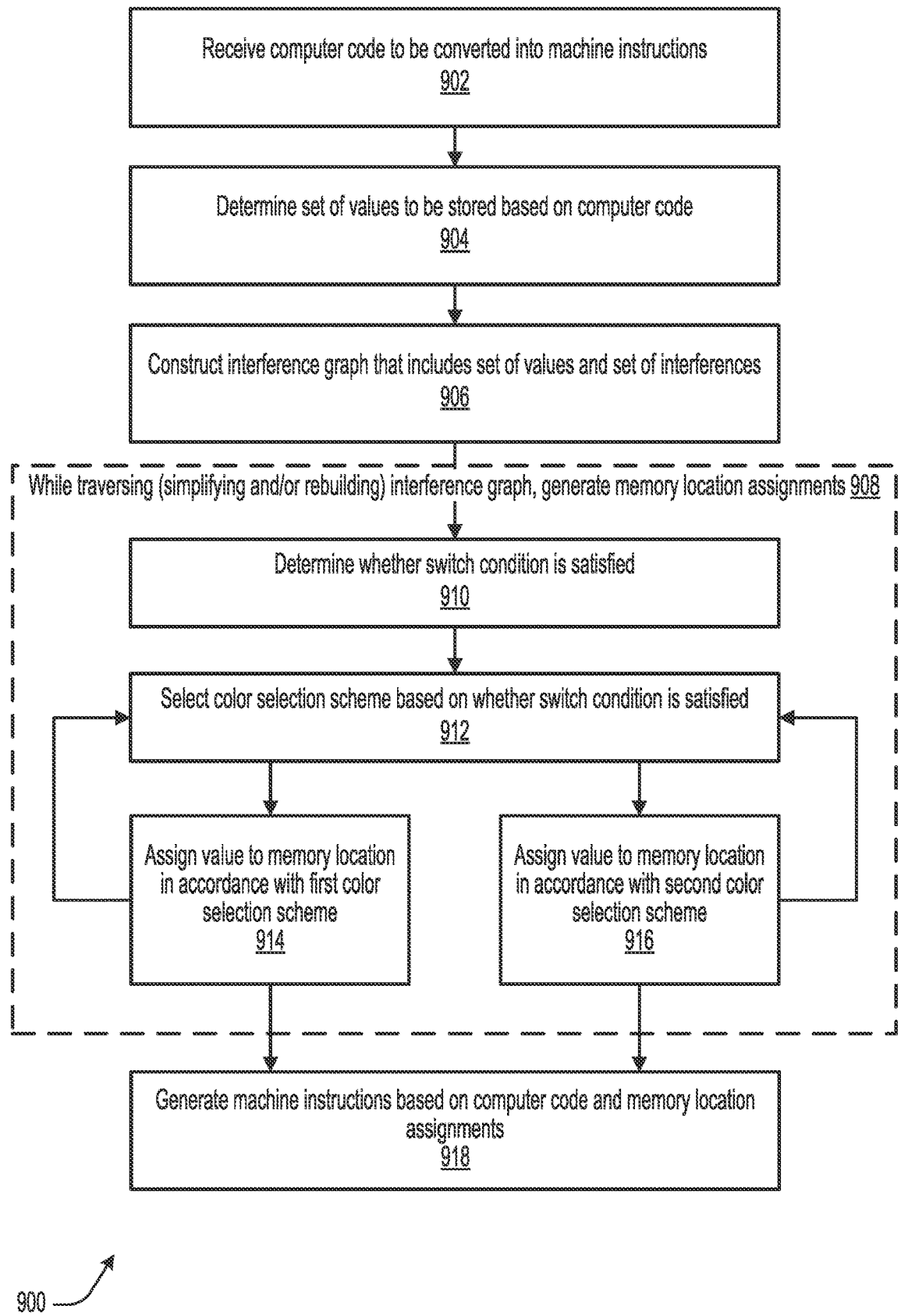
FIG. 9 illustrates a compiler-implemented method for performing a storage allocation.

FIG. 9 illustrates a compiler-implemented method 900 for performing a storage allocation, in accordance with some embodiments. One or more steps of method 900 may be omitted during performance of method 900, and steps of method 900 may be performed in any order and/or in parallel. One or more steps of method 900 may be performed by one or more processors. Method 900 may utilize or may be used in conjunction with one or more steps of method 800.

At step 902, the computer code is received. Step 902 may be similar to step 802. At step 904, the set of values that are to be stored on the integrated circuit device during the execution of the machine instructions on the integrated circuit device are determined. Step 904 may be similar to step 804. At step 906, the interference graph that includes the set of values and the set of interferences is constructed. Step 906 may be similar to step 806.

At step 908, memory location assignments are generated while traversing the interference graph. Step 908 may be similar to and include elements or features from step 808. In some embodiments, step 908 may include one or more of steps 910, 912, 914, or 916. At step 910, the compiler determines whether a switch condition is satisfied. In some embodiments, determining whether the switch condition is satisfied may include determining whether all spill candidates from the set of values have been handled (colored or spilled), determining whether a spilling risk is above or below a predetermined threshold, determining whether a value is defined by a low-latency instruction, or determining whether a value is defined by a high-latency instruction, among other possibilities.

At step 912, a color selection scheme is selected based on whether the switch condition is satisfied. In some embodiments, a first color selection scheme is selected when the switch condition is not satisfied and a second color selection scheme is selected when the switch condition is satisfied. The first color selection scheme may be the color reuse scheme and the second color selection scheme may be the color rotation scheme. In some embodiments, step 912 may be performed for each value of the set of values.

At step 914, the value is assigned to a memory location in accordance with the first color selection scheme. At step 916, the value is assigned to a memory location in accordance with the second color selection scheme. In some embodiments, a first portion of the set of values may be assigned to the set of memory locations in accordance with the first color selection scheme and a second portion of the set of values may be assigned to the set of memory locations in accordance with the second color selection scheme. In some embodiments, once step 912 and steps 914 or 916 are performed for each of the set of values, method 900 may proceed to step 918.

At step 918, the machine instructions are generated based on the computer code while incorporating the set of memory location assignments. Step 918 may be similar to step 812.

Figure 10:
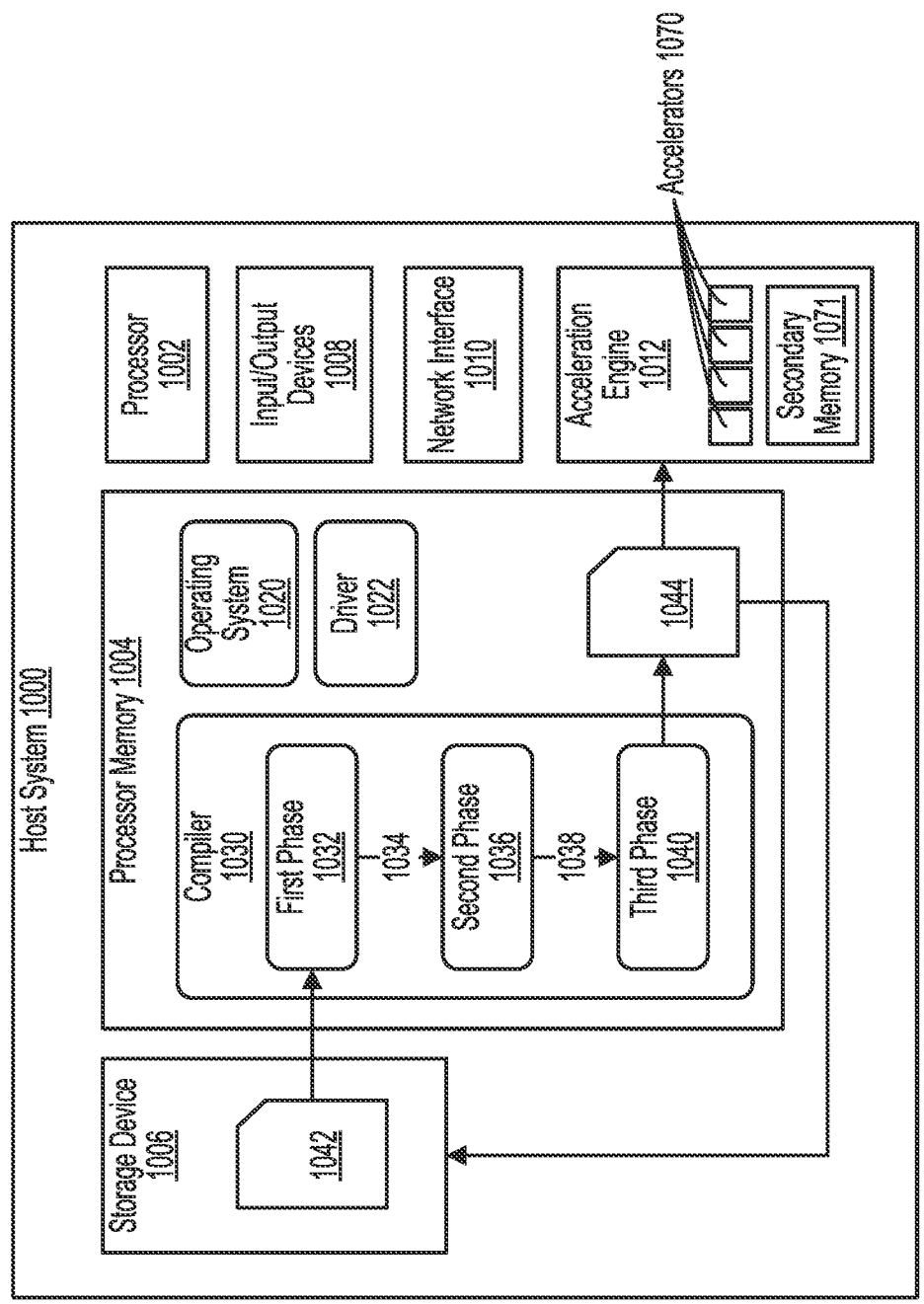
FIG. 10 illustrates an example of a host system on which a compiler can run.

FIG. 10 illustrates an example of a host system 1000 on which a compiler 1030 can run, in accordance with some embodiments. The illustrated host system 1000 is an example of a computing device, and includes a processor 1002, a processor memory 1004, at least one storage device 1006, various Input/Output (I/O) devices 1008, and at least one network interface 1010. In the example of FIG. 10, host system 1000 also includes an acceleration engine 1012, which is an integrated circuit device that can accelerate certain operations or computations performed by host system 1000. In various examples, host system 1000 can be implemented as a server in a data center, a desktop computer, a laptop computer, a tablet computer, or a smartphone, among other examples. In some examples, operations or components discussed below as performed or included in host system 1000 can be performed or included in other computer devices. For example, compiler 1030 can execute on host system 1000 while acceleration engine 1012 is located at a different host system.

Processor 1002 is an integrated circuit device that can execute program code, in the form of instructions. The program code can be used for various software applications or tools, such as an operating system 1020 or compiler 1030. While processor 1002 is executing a program, the instructions for the program can be stored in processor memory 1004. The instructions can also be stored elsewhere, such as on storage device 1006, and can be loaded into processor memory 1004 when needed by processor 1002. Processor 1002 can also use processor memory 1004 for temporary storage of other data on which processor 1002 is operating. In various examples, processor memory 1004 is a volatile memory type, such as a type of Random Access Memory, though non-volatile memory types can, alternatively or additionally, be used for processor memory 1004.

Storage device 1006 is an example of a device that can include non-volatile memory. For example, storage device 1006 can be a magnetic disk drive, a solid state drive, or an optical drive, among other examples. Storage device 1006 can further be non-transitory, such that program code and other data stored on storage device 1006 remains present when storage device 1006 is not powered on.

Storage device 1006 is one example of a peripheral device, which are components that can be coupled to host system 1000 to add functionality to host system 1000. Other examples of peripheral devices include Input/Output devices 1008 and network interface 1010. Input/Output devices 1008 can include user input and output devices, such as keyboards, mice, touch screens, microphones, display screens, speakers, printers, and scanners, among other examples. Network interface 1010, which can be implemented using a network interface card, can provide access to one or more networks. Network interface 1010 can include, for example, a physical port for connecting a network cable and/or wireless antennas for communicating with Wi-Fi and/or cellular networks. Network interface 1010 can also be described as an I/O device.

Acceleration engine 1012 is also another type of peripheral device or I/O device. Acceleration engine 1012 is a device that is purpose built to perform certain operations that can be performed by processor 1002, but can be performed faster by acceleration engine 1012. For example, acceleration engine 1012 can include one or more neural network accelerators 1070, and, as such, may be able to perform the large scale, parallel computations of a neural network more efficiently than when the computations are performed by processor 1002. As another example, acceleration engine 1012 can be a GPU, and may be optimized to perform the computations needed for graphics rendering. Other examples of devices that can be implemented by acceleration engine 1012 include cryptographic accelerators, compression and decompression accelerators, 3-D accelerators, regular expression accelerators, security accelerators, and others.

In various examples, acceleration engine 1012 can execute program code to perform certain operations. For example, when acceleration engine 1012 includes one or more neural network accelerators 1070, acceleration engine 1012 can be programmed to execute a particular neural network, such as one that performs image recognition or one that performs machine translation. As a further example, to support the execution of a neural network, acceleration engine 1012 can be programed to perform operations such as copying data for the neural network from processor memory 1004 (for example) into acceleration engine 1012, copying input data for the neural network from processor memory 1004 into acceleration engine 1012, and/or copying results from acceleration engine 1012 into processor memory 1004, among other examples.

To generate program code for acceleration engine 1012, in various examples, host system 1000 can execute compiler 1030. Compilers, in general, are software programs that translate program code written in a human-readable language into a format (e.g., machine instructions) that can be read and processed by an integrated circuit device. In the example of FIG. 10, acceleration engine 1012 includes one or more neural network accelerators 1070 and compiler 1030 is for compiling a neural network description into instructions to be executed on acceleration engine 1012. When acceleration engine 1012 implements a different type of accelerator, another compiler can be used.

Compiler 1030 can be activated, for example, when operating system 1020 receives keyboard, mouse, touchscreen, voice commands, or other inputs from Input/Output devices 1008. The inputs can further include parameters for compiler 1030, such as input code 1042 to compile and configuration options for the compilation process. Once compiler 1030 is activated, processor 1002 can load the instructions for compiler 1030 into processor memory 1004, and can execute the instructions.

In the example of FIG. 10, compiler 1030 includes a first stage 1032, a second stage 1036, and a third stage 1040, which each perform different operations to produce compiled code 1044. In other examples, compiler 1030 can combine the operations of first stage 1032, second stage 1036, and/or third stage 1040 into fewer stages, or can divide the operations of one of the stages into multiple stages.

First stage 1032 can receive and process input code 1042. Input code 1042 can describe a program in a high-level programming language, such as Java, C++, or Tensorflow, among many other examples. Input code 1042 can describe, for example, steps to perform image recognition, speech recognition, machine translation, or other operations. Input code 1042 can be obtained, for example, from storage device 1006. Alternatively, though not illustrated here, input code 1042 may be located in processor memory 1004 or can be obtained from a network location, using network interface 1010. Processing of input code 1042 can include sorting the operations described in input code 1042 into layers, where the outputs of one layer provide the inputs to a next layer. Processing can also include identifying steps to be performed by processor 1002, rather than by acceleration engine 1012. For example, processor 1002, through the execution of a driver 1022, may need to perform steps such as configuring Direct Memory Access (DMA) descriptors for moving data into or out of acceleration engine 1012, among other examples.

The output 1034 of first stage 1032 can be organized, for example, in the layers, nodes, and connections between nodes of a neural network. Second stage 1036 can perform intermediate processing on this output 1034. For example, the operations performed in any one layer, or at any one node in a layer, may be too many for acceleration engine 1012 to perform at the same time. Acceleration engine 1012 may, for example, have a limited amount of local storage space for the data needed for a computation, or the computations may be more than acceleration engine 1012 can perform at one time. In this example, first stage 1032 can break the operations of the layer or node down into smaller operations, which can fit into the acceleration engine's local memory and/or can fit into the computing capacity of acceleration engine 1012. Processing of the output 1034 of first stage 1032 can include other steps, such as scheduling, or determining the order in which acceleration engine 1012 and/or processor 1002 will perform operations, among other examples.

In various examples, output 1038 of second stage 1036 includes the various steps to be performed by components of acceleration engine 1012, in the order that the steps are to be performed. Output 1038 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

Third stage 1040 can operate on output 1038 of second stage 1036, and perform various steps before producing the instructions that are to be executed by acceleration engine 1012. These steps can include, for example, removing redundant dependencies, resolving or handling dependencies between nodes by inserting synchronization instructions into the code, identifying possible optimizations in memory usage or memory bandwidth usage, and other operations.

The output of third stage 1040 is compiled code 1044, which may include machine instructions in binary format. In some examples, compiled code 1044 can be stored in processor memory 1004. Alternatively or additionally, compiled code 1044 can be copied to storage device 1006 or to a network location. As noted above, acceleration engine 1012 may be located at a different host system, in which case compiled code 1044 can be sent over network interface 1010 to the other host system.

In some embodiments, each of accelerators 1070 may include one or more low-latency (or lower-latency) memories (e.g., SRAM) for storing values that are generated during the execution of compiled code 1044 on accelerators 1070. In some embodiments, acceleration engine 1012 may further include a secondary memory 1071 that may be a high-latency (or higher-latency) memory (e.g., DRAM) for storing any of the values that are unable to be stored in the low-latency memories of accelerators 1070. In some embodiments, compiler 1030 may generate compiled code 1044 that includes memory location assignments indicating where each value that is generated during the execution of compiled code 1044 is to be stored.

In the example of FIG. 10, host system 1000 can execute a driver 1022, which can also be referred to as a device driver or runtime driver, that manages acceleration engine 1012. Driver 1022 can provide an interface between applications executing on host system 1000 (or on another host system) and acceleration engine 1012. For example, driver 1022 can provide an Application Program Interface (API) that defines functions for feeding input data to acceleration engine 1012 and defining the operation to perform on the input data. In this and other examples, driver 1022 can configure acceleration engine 1012 to perform the operation. For example, driver 1022 can identify a neural network that acceleration engine 1012 is to execute, as well as the location in processor memory 1004 or on storage device 1006 where compiled code 1044 for the neural network is located. Driver 1022 can further load into acceleration engine 1012 or cause acceleration engine 1012 to load compiled code 1044, can load or cause acceleration engine 1012 to load the input data on which the neural network is to operate, and/or can cause acceleration engine 1012 to begin executing on the input data. Once acceleration engine 1012 has finished, acceleration engine 1012 can notify driver 1022, and driver 1022 can deliver a result back to the application that requested the result.

Figure 11:
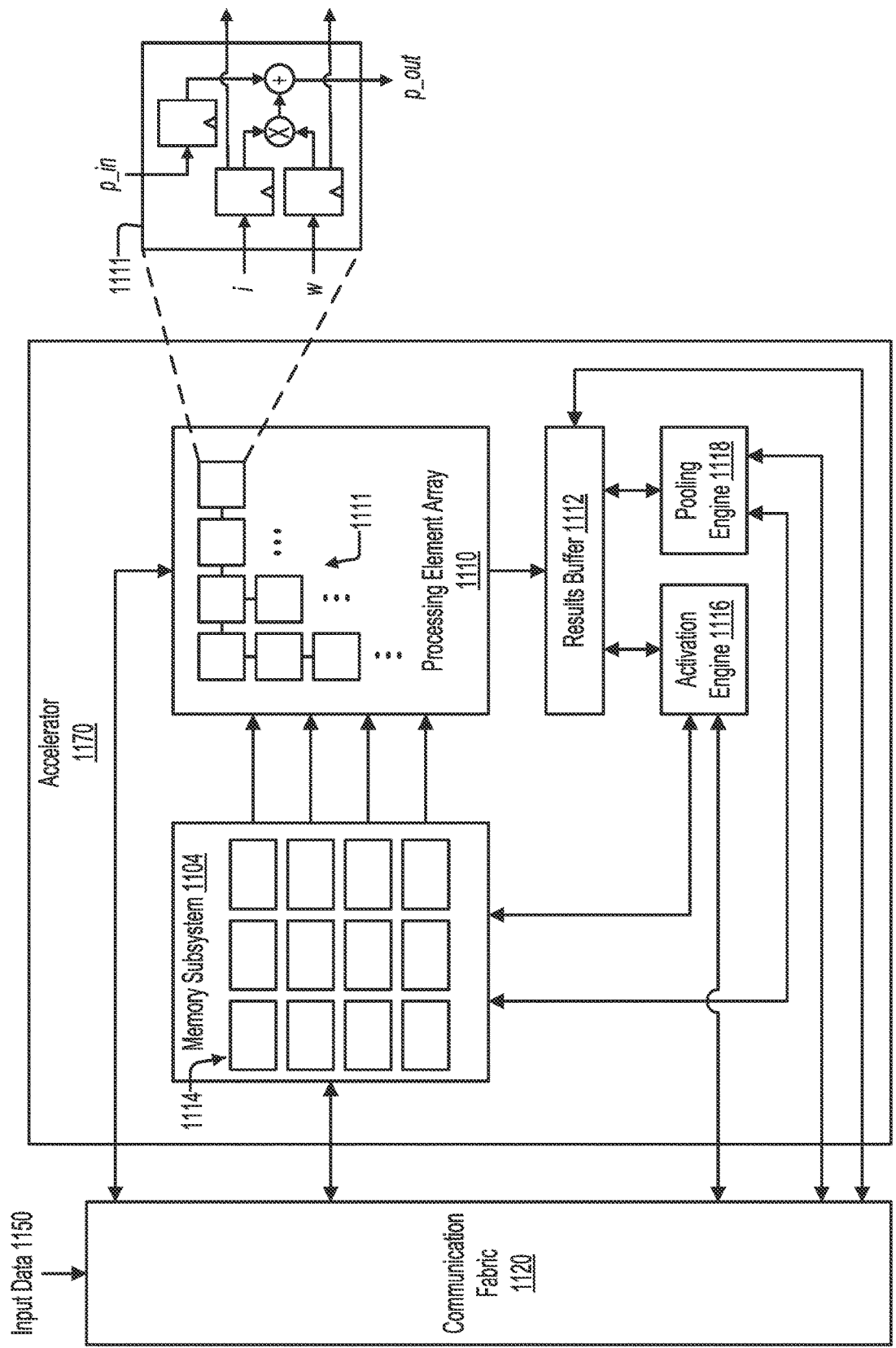
FIG. 11 illustrates an example of an integrated circuit device.

FIG. 11 illustrates an example of an integrated circuit device, in accordance with some embodiments. The example of FIG. 11 illustrates an accelerator 1170. In various examples, accelerator 1170, for a set of input data (e.g., input data 1150), can execute computations using a processing element array 1110, an activation engine 1116, and/or a pooling engine 1118. In some examples, the example accelerator 1170 may be an integrated circuit component of a processor, such as a neural network processor. The processor may have other integrated circuit components, including additional accelerator engines.

In various implementations, memory subsystem 1104 can include multiple memory banks 1114. In these implementations, each memory bank 1114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1114. For example, each memory bank can be a physically separate memory component that has an address space that is separate and independent of the address spaces of each other memory bank. In this example, each memory bank may have at least one read channel and may have at least one separate write channel that can be used at the same time. In these examples, memory subsystem 1104 can permit simultaneous access to the read or write channels of multiple memory banks. As another example, memory subsystem 1104 can include arbitration logic such that arbitration between, for example, the outputs of multiple memory banks 1114 can result in more than one memory bank's output being used. In these and other examples, though globally managed by memory subsystem 1104, each memory bank can be operated independently of any other.

Having memory banks 1114 be independently accessible can increase the efficiency of accelerator 1170. For example, values can be simultaneously read and provided to each row of processing element array 1110, so that the entire processing element array 1110 can be in use in one clock cycle. As another example, memory banks 1114 can be read at the same time that results computed by processing element array 1110 are written to memory subsystem 1104. In contrast, a single memory may be able to service only one read or write at a time. With a single memory, multiple clock cycles can be required, for example, to read input data for each row of processing element array 1110 before processing element array 1110 can be started.

In various implementations, memory subsystem 1104 can be configured to simultaneously service multiple clients, including processing element array 1110, activation engine 1116, pooling engine 1118, and any external clients that access memory subsystem 1104 over a communication fabric 1120. In some implementations, being able to service multiple clients can mean that memory subsystem 1104 has at least as many memory banks as there are clients. In some cases, each row of processing element array 1110 can count as a separate client. In some cases, each column of processing element array 1110 can output a result, such that each column can count as a separate write client. In some cases, output from processing element array 1110 can be written into memory banks 1114 that can then subsequently provide input data for processing element array 1110. As another example, activation engine 1116 and pooling engine 1118 can include multiple execution channels, each of which can be separate memory clients. Memory banks 1114 can be implemented, for example, using static random access memory (SRAM).

In various implementations, memory subsystem 1104 can include control logic. The control logic can, for example, keep track of the address spaces of each of memory banks 1114, identify memory banks 1114 to read from or write to, and/or move data between memory banks 1114. In some implementations, memory banks 1114 can be hardwired to particular clients. For example, a set of memory banks 1114 can be hardwired to provide values to the rows of processing element array 1110, with one memory bank servicing each row. As another example, a set of memory banks can be hard wired to receive values from columns of processing element array 1110, with one memory bank receiving data for each column.

Processing element array 1110 is the computation matrix of the example accelerator 1170. Processing element array 1110 can, for example, execute parallel integration, convolution, correlation, and/or matrix multiplication, among other things. Processing element array 1110 includes multiple processing engines 1111, arranged in rows and columns, such that results output by one processing engine 1111 can be input directly into another processing engine 1111. Processing engines 1111 that are not on the outside edges of processing element array 1110 thus can receive data to operate on from other processing engines 1111, rather than from memory subsystem 1104.

In various examples, processing element array 1110 uses systolic execution, in which data arrives at each processing engine 1111 from different directions at regular intervals. In some examples, input data can flow into processing element array 1110 from the left and weight values can be loaded at the top. In some examples weights and input data can flow from the left and partial sums can flow from top to bottom. In these and other examples, a multiply-and-accumulate operation moves through processing element array 1110 as a diagonal wave front, with data moving to the right and down across the array. Control signals can be input at the left at the same time as weights, and can flow across and down along with the computation.

In various implementations, the number of columns in processing element array 1110 determines the computational capacity of processing element array 1110, and the number of rows determines the required memory bandwidth for achieving maximum utilization of processing element array 1110. Processing element array 1110 can have, for example, 64 columns and 428 rows, or some other number of columns and rows.

An example of a processing engine 1111 is illustrated in FIG. 11 in an inset diagram. As illustrated by this example, a processing engine 1111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1111.

In the illustrated example, an input from above can include a partial sum, p in, provided either from another processing engine 1111 or from a previous round of computation by processing element array 1110. When starting a computation for a new set of input data, the top row of processing element array 1110 can receive a fixed value for p in, such as zero. As illustrated by this example, i and w are multiplied together and the result is summed with p in to produce a new partial sum, p out, which can be input into another processing engine 1111. Various other implementations of processing engine 1111 are possible.

Outputs from the last row in processing element array 1110 can be temporarily stored in results buffer 1112. The results can be intermediate results, which can be written to memory banks 1114 to be provided to processing element array 1110 for additional computation. Alternatively, the results can be final results, which, once written to memory banks 1114 can be read from memory subsystem 1104 over communication fabric 1120, to be output by the system.

In some implementations, accelerator 1170 includes an activation engine 1116. In these implementations, activation engine 1116 can combine the results from processing element array 1110 into one or more output activations. For example, for a convolutional neural network, convolutions from multiple channels can be summed to produce an output activation for a single channel. In other examples, accumulating results from one or more columns in processing element array 1110 may be needed to produce an output activation for a single node in the neural network. In some examples, activation engine 1116 can be bypassed.

In various examples, activation engine 1116 can include multiple separate execution channels. In these examples, the execution channels can correspond to the columns of processing element array 1110, and can perform an operation on the outputs of a column, the result of which can be stored in memory subsystem 1104. In these examples, activation engine 1116 may be able to perform between 1 and n parallel computations, where n is equal to the number of columns in processing element array 1110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 1170 can include a pooling engine 1118. Pooling is the combining of outputs of the columns of processing element array 1110. Combining can include for example, computing a maximum value, a minimum value, an average value, a median value, a summation, a multiplication, or another logical or mathematical combination. In various examples, pooling engine 1118 can include multiple execution channels that can operating on values from corresponding columns of processing element array 1110. In these examples, pooling engine 1118 may be able to perform between 1 and n parallel computations, where n is equal to the number of columns in processing element array 1110. In various examples, execution channels of pooling engine 1118 can operate in parallel and/or simultaneously. In some examples, pooling engine 1118 can be bypassed.

Herein, activation engine 1116 and pooling engine 1118 may be referred to collectively as execution engines. Processing element array 1110 is another example of an execution engine. Another example of an execution engine is a Direct Memory Access (DMA) engine, which may be located outside accelerator 1170.

Input data 1150 can arrive over communication fabric 1120. Communication fabric 1120 can connect accelerator 1170 to other components of a processor, such as a DMA engine that can obtain input data 1150 from an Input/Output (I/O) device, a storage drive, or a network interface. Input data 1150 can be, for example one-dimensional data, such as a character string or numerical sequence, or two-dimensional data, such as an array of pixel values for an image or frequency and amplitude values over time for an audio signal. In some examples, input data 1150 can be three-dimensional, as may be the case with, for example, the situational information used by a self-driving car or virtual reality data. In some implementations, memory subsystem 1104 can include a separate buffer for input data 1150. In some implementations, input data 1150 can be stored in memory banks 1114 when accelerator 1170 receives input data 1150.

In some examples, accelerator 1170 can implement a neural network processing engine. In these examples, accelerator 1170, for a set of input data 1150, can execute a neural network to perform a task for which the neural network was trained. Executing a neural network on a set of input data can be referred to as inference or performing inference.

The weights for the neural network can be stored in memory subsystem 1104, along with input data 1150 on which the neural network will operate. The neural network can also include instructions, which can program processing element array 1110 to perform various computations on the weights and the input data. The instructions can also be stored in memory subsystem 1104, in memory banks 1114 or in a separate instruction buffer. Processing element array 1110 can output intermediate results, which represent the outputs of individual layers of the neural network. In some cases, activation engine 1116 and/or pooling engine 1118 may be enabled for computations called for by certain layers of the neural network. Accelerator 1170 can store the intermediate results in memory subsystem 1104 for inputting into processing element array 1110 to compute results for the next layer of the neural network. Processing element array 1110 can further output final results from a last layer of the neural network. The final results can be stored in memory subsystem 1104 and then be copied out to host processor memory or to another location.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-program product tangibly embodied in a non-transitory machine-readable storage medium, the computer-program product including instructions configured to cause a processor to perform operations for executing a compiler, the operations comprising:
   determining a set of values that are to be stored at a set of memory locations of an integrated circuit device based on computer code;
   constructing an interference graph that includes the set of values and a set of interferences connecting the set of values, each of the set of interferences connecting two of the set of values that are concurrently stored during execution of machine instructions on the integrated circuit device;
   performing a simplification process to incrementally remove each value of the set of values from the interference graph in accordance with a first order until all values are removed;
   at a particular point while performing the simplification process:
      determining that none of the remaining set of values are connected to a quantity of other values that is less than a threshold;
      selecting one of the remaining set of values to be a spill candidate;
      removing the spill candidate from the interference graph; and
      continuing performing the simplification process until all values in the interference graph are removed;
   performing a rebuilding process to add the set of values back to the interference graph in accordance with a second order determined from the first order by repeatedly assigning one of the set of values to one of the set of memory locations in accordance with a first color selection scheme;
   at the particular point at which the spill candidate was removed from the interference graph, and while performing the rebuilding process, switching from the first color selection scheme to a second color selection scheme that is different from the first color selection scheme;

continuing the rebuilding process to add the remaining set of values back to the interference graph in accordance with the second order by repeatedly assigning one of the remaining set of values to one of the set of memory locations in accordance with the second color selection scheme; and generating, by the compiler, the machine instructions incorporating the assigned set of values to the set of memory locations.

2. The computer-program product of claim 1, wherein performing the simplification process includes, repeatedly:
identifying a value of the set of values that is connected to a quantity of other values less than the threshold; and
removing the value from the interference graph.

3. The computer-program product of claim 1, wherein the first color selection scheme is a color reuse scheme that provides that a set of colors are unevenly considered for selection for the set of values.

4. The computer-program product of claim 3, wherein the second color selection scheme is a color rotation scheme that provides that the set of colors are sequentially and evenly considered for selection for the set of values.

5. The computer-program product of claim 1, wherein the operations further comprise:
receiving the computer code to be converted into the machine instructions for execution on the integrated circuit device.

6. The computer-program product of claim 1, wherein the set of memory locations are of a memory comprising a set of processor registers, a scratchpad memory, or a cache.

7. The computer-program product of claim 1, wherein the computer code is an intermediate representation of source code.

8. The computer-program product of claim 1, wherein each of the set of values is one of a scalar, a vector, a tensor, or an array.

9. A computer-implemented method comprising:
determining a set of values that are to be stored at a set of memory locations of an integrated circuit device based on computer code;
constructing an interference graph that includes the set of values and a set of interferences connecting the set of values, each of the set of interferences connecting two of the set of values that are concurrently stored during execution of machine instructions on the integrated circuit device;
performing a simplification process to incrementally remove each value of the set of values from the interference graph in accordance with a first order until all values are removed;
at a particular point while performing the simplification process:
determining that none of the remaining set of values are connected to a quantity of other values that is less than a threshold;
selecting one of the remaining set of values to be a spill candidate;
removing the spill candidate from the interference graph; and
continuing performing the simplification process until all values in the interference graph are removed;
performing a rebuilding process to add the set of values back to the interference graph in accordance with a second order determined from the first order by repeatedly assigning one of the set of values to one of the set of memory locations in accordance with a first color selection scheme;

at the particular point at which the spill candidate was removed from the interference graph, and while performing the rebuilding process, switching from the first color selection scheme to a second color selection scheme that is different from the first color selection scheme;

continuing the rebuilding process to add the remaining set of values back to the interference graph in accordance with the second order by repeatedly assigning one of the remaining set of values to one of the set of memory locations in accordance with the second color selection scheme; and generating, by a compiler, the machine instructions incorporating the assigned set of values to the set of memory locations.

10. The computer-implemented method of claim 9, wherein performing the simplification process includes, repeatedly:
identifying a value of the set of values that is connected to a quantity of other values less than the threshold; and
removing the value from the interference graph.

11. The computer-implemented method of claim 9, wherein the first color selection scheme is a color reuse scheme that provides that a set of colors are unevenly considered for selection for the set of values.

12. The computer-implemented method of claim 11, wherein the second color selection scheme is a color rotation scheme that provides that the set of colors are sequentially and evenly considered for selection for the set of values.

13. The computer-implemented method of claim 9, further comprising:
receiving the computer code to be converted into the machine instructions for execution on the integrated circuit device.

14. The computer-implemented method of claim 9, wherein the set of memory locations are of a memory comprising a set of processor registers, a scratchpad memory, or a cache.

15. The computer-implemented method of claim 9, wherein the computer code is an intermediate representation of source code.

16. The computer-implemented method of claim 9, wherein each of the set of values is one of a scalar, a vector, a tensor, or an array.

17. A system comprising:
one or more processors; and
a non-transitory computer-readable medium comprising instructions that, when executed by the one or more processors, cause the one or more processors to perform operations for executing a compiler, the operations comprising:
determining a set of values that are to be stored at a set of memory locations of an integrated circuit device based on computer code;
constructing an interference graph that includes the set of values and a set of interferences connecting the set of values, each of the set of interferences connecting two of the set of values that are concurrently stored during execution of machine instructions on the integrated circuit device;
performing a simplification process to incrementally remove each value of the set of values from the interference graph in accordance with a first order until all values are removed;

at a particular point while performing the simplification process:
  determining that none of the remaining set of values are connected to a quantity of other values that is less than a threshold;
  selecting one of the remaining set of values to be a spill candidate;
  removing the spill candidate from the interference graph; and
  continuing performing the simplification process until all values in the interference graph are removed;
performing a rebuilding process to add the set of values back to the interference graph in accordance with a second order determined from the first order by repeatedly assigning one of the set of values to one of the set of memory locations in accordance with a first color selection scheme;
at the particular point at which the spill candidate was removed from the interference graph, and while performing the rebuilding process, switching from the first color selection scheme to a second color selection scheme that is different from the first color selection scheme;
  continuing the rebuilding process to add the remaining set of values back to the interference graph in accordance with the second order by repeatedly assigning one of the remaining set of values to one of the set of memory locations in accordance with the second color selection scheme; and
generating, by the compiler, the machine instructions incorporating the assigned set of values to the set of memory locations.

18. The system of claim 17, wherein performing the simplification process includes, repeatedly:
  identifying a value of the set of values that is connected to a quantity of other values less than the threshold; and
  removing the value from the interference graph.

19. The system of claim 17, wherein the first color selection scheme is a color reuse scheme that provides that a set of colors are unevenly considered for selection for the set of values.

20. The system of claim 19, wherein the second color selection scheme is a color rotation scheme that provides that the set of colors are sequentially and evenly considered for selection for the set of values.

* * * * *